US008595709B2

(12) United States Patent
Rao et al.

(10) Patent No.: US 8,595,709 B2
(45) Date of Patent: Nov. 26, 2013

(54) BUILDING AN APPLICATION CALL GRAPH FROM MULTIPLE SOURCES

(75) Inventors: Abhijit Rao, Seattle, WA (US); John Lyon-Smith, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1020 days.

(21) Appl. No.: 12/634,691

(22) Filed: Dec. 10, 2009

(65) Prior Publication Data
US 2011/0145800 A1    Jun. 16, 2011

(51) Int. Cl.
    G06F 9/44    (2006.01)
(52) U.S. Cl.
    USPC .......................................................... 717/133
(58) Field of Classification Search
    USPC .......................................................... 717/133
    See application file for complete search history.

(56) References Cited

U.S. PATENT DOCUMENTS

| | | | |
|---|---|---|---|
| 6,077,311 A | 6/2000 | Lichtenstein et al. | |
| 7,877,642 B2 * | 1/2011 | Ding et al. | 717/133 |
| 2002/0032718 A1 | 3/2002 | Yates et al. | |
| 2002/0194393 A1 | 12/2002 | Hrischuk et al. | |
| 2003/0018603 A1 | 1/2003 | Tip et al. | |
| 2008/0134152 A1 | 6/2008 | Edde et al. | |
| 2009/0070638 A1 | 3/2009 | Huang et al. | |
| 2009/0217297 A1 | 8/2009 | Steiner | |

OTHER PUBLICATIONS

Zhao, et al., "Visualizing the Execution of Threads-based Parallel Programs", Retrieved at <<http://smartech.gatech.edu/bitstream/1853/3546/1/95-01.pdf >>, Georgia Institute of Technology, Jan. 1995, pp. 1-17.
Reiss, et al., "Encoding Program Executions",Retreived at <<http://www.cs.brown.edu/~er/papers/icse01.pdf>>, Proceedings of the 23rd International Conference on Software Engineering, 2001, pp. 221-230.

* cited by examiner

Primary Examiner — Chun-Kuan Lee

(57) ABSTRACT

A system and method for generating a computer program call graph. A profiler may insert probes into a debuggee computer program, the probes generating call trace events. Checkpoints may be performed during execution of the debuggee program, so that a snapshot of the call stack is performed. Call trace events and checkpoint snapshots are logged and serialized. Logged call trace events and checkpoints may be retrieved and used in combination to generate a call graph and a shadow stack. Mechanisms facilitate combining the different sources of debuggee program information and determining whether the call graph and shadow stack are determinate or indeterminate at any time. The mechanisms may provide for improved accuracy of generated call graphs.

20 Claims, 13 Drawing Sheets

BUILDING AN APPLICATION CALL GRAPH FROM MULTIPLE SOURCES

BACKGROUND

One technique for analyzing or debugging a program employs a call graph that indicates function calls made during an execution of a computer program. A call graph may include temporal information, indicating a sequence of function calls. One way of generating a call graph is to insert instructions within the user program, the execution of the instructions causing certain events to occur. During execution of the computer program, these events may be written to a log file. After execution of the computer program, an analysis program may examine the log file and generate a call graph, based on the sequence of events. This technique is referred to as a call trace, and the events are referred to as call trace events. A developer may use the call graph generated by a call trace to analyze the computer program in order to find problems, such as bugs or inefficiencies. In some environments, portions of a computer program, or functions invoked by a computer program, may not be available to insert event instructions. For example, system functions or library functions may be invoked, either of which may not be available for inserting event instructions.

Another debugging technique involves taking a snapshot of the program's call stack. During execution of the program, a developer may break execution of the program at a desired point, and examine the contents of the call stack. The call stack indicates a sequence of frames. The frames correspond to functions that are currently invoked, with the top frame of the stack indicating the current function, the next frame down indicating a parent function, and so forth. Some debugging systems may periodically take snapshots of the call stack and write them to a log file, for a later analysis by a developer. This technique is referred to as a sample trace. Sample traces provide accurate information, though it may be incomplete due to the fact that they are simply snapshots of an executing program.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, a system, method, and components operate to generate a call graph representing function calls in a debuggee program, based on a stream of logged events, the logged events including call trace events and at least one sample trace event. This may include adding nodes to the call graph based on call trace events indicating that functions have been invoked, and adding other nodes to the call graph based on one or more sample trace events indicating that other functions have been invoked. It may include modifying the call graph to indicate that active nodes are no longer active, based on additional call trace events or sample trace events. Nodes that have been made active in response to a sample trace event may be designated as inactive based on a call trace event. Thus, both call trace events and sample trace events contribute to generating and modifying the call graph.

In some embodiments, the call graph comprises a tree structure with nodes representing functions, and a cursor indicating active nodes of the tree structure, including a current active node.

In some embodiments, a process may generate a shadow stack corresponding to an execution of the debuggee program, based on at least one sample trace event and at least one call trace event. This may include adding at least one frame to the shadow stack in response to receiving a call trace event indicating that the corresponding function has been invoked. It may include deleting a frame from the shadow stack in response to a call trace event indicating that the corresponding function has exited.

In one embodiment, a common frame count may be calculated based on two sample trace events, together with a call trace event indicating that a function has exited.

In one embodiment, the call graph may be modified to indicate that multiple functions have exited, based on a received event indicating that an exception has occurred in the debuggee program. One or more nodes may be added to the call graph to indicate that a function has been invoked during handling of the exception in the debuggee program. Based on one or more events that occurred during handling of an exception, a number of frames searched during handling of the exception may be determined, and approximately the number of frames searched may be deleted from the shadow stack.

To the accomplishment of the foregoing and related ends, certain illustrative aspects of the system are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

To assist in understanding the present invention, reference will be made to the following Detailed Description, which is to be read in association with the accompanying drawings, wherein.

DETAILED DESCRIPTION

Figure 1A:
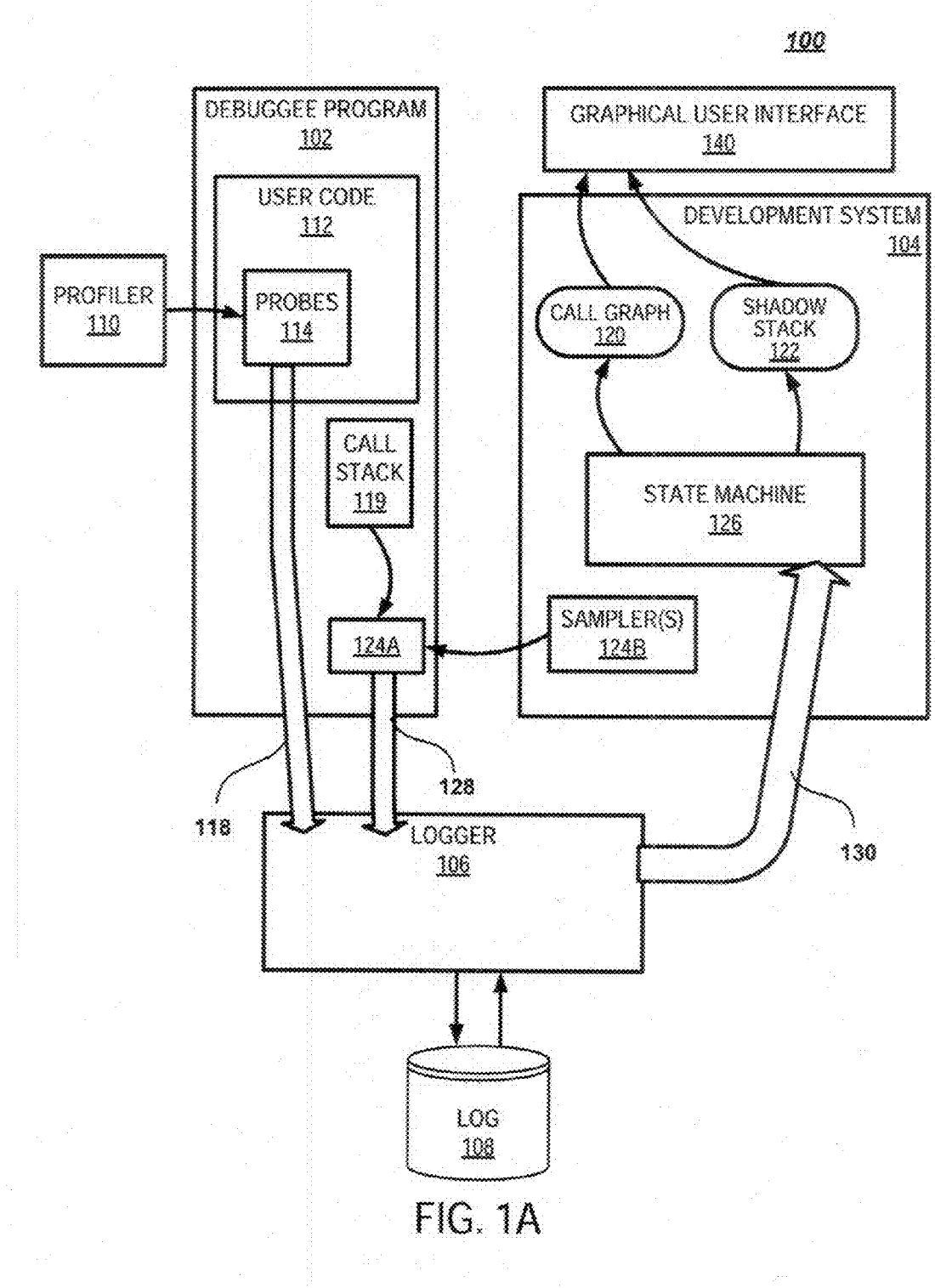
FIG. 1A is a block diagram illustrating an example embodiment of a debugging system that may be employed to generate a call graph.

Example embodiments of the present invention now will be described more fully hereinafter with reference to the accompanying drawings, which form a part hereof, and which show, by way of illustration, specific example embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to a previous embodiment, though it may. Furthermore, the phrase "in another embodiment" as used herein does not necessarily refer to a different embodiment, although it may. Thus, various embodiments of the invention may be readily combined, without departing from the scope or spirit of the invention. Similarly, the phrase "in one implementation" as used herein does not necessarily refer to the same implementation, though it may, and techniques of various implementations may be combined.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The components described herein may execute from various computer-readable media having various data structures thereon. The components may communicate via local or remote processes such as in accordance with a signal having one or more data packets (e.g. data from one component interacting with another component in a local system, distributed system, or across a network such as the Internet with other systems via the signal). Software components may be stored, for example, on computer-readable storage media including, but not limited to, an application specific integrated circuit (ASIC), compact disk (CD), digital versatile disk (DVD), random access memory (RAM), read only memory (ROM), floppy disk, hard disk, electrically erasable programmable read only memory (EEPROM), flash memory, or a memory stick in accordance with embodiments of the present invention.

The term computer-readable media as used herein includes both storage media and communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media.

As used herein, the term "application" refers to a computer program or a portion thereof, and may include associated data. An application may be an independent program, or it may be designed to provide one or more features to another application. An "add-in" and a "plug-in" are examples of applications that interact with and provides features to a "host" application.

An application is made up of any combination of application components, which may include program instructions, data, text, object code, images or other media, security certificates, scripts, or other software components that may be installed on a computing device to enable the device to perform desired functions. Application components may exist in the form of files, libraries, pages, binary blocks, or streams of data.

As used herein, the term "function" refers to a portion of code within a larger program that performs a specific task, and can execute relatively independent of other portions of the program. A function may, but does not necessarily, return a value. In various computer languages, different terms may be used, such as subroutine, method, procedure, or subprogram. As used herein, the term "function" may include any one or more of these. As used herein, "calling" a function and "invoking" a function are synonyms. A function that calls another function is referred to as a "parent function" of the other function. A function that calls itself is a parent of itself. An "instance" of a function refers to an invocation of the function. A function may have one or more instances during an execution of the computer program. As used herein, the term function refers to an instance of a function, unless it is clear from the context that it refers to the function itself.

FIG. 1A is a block diagram illustrating an example embodiment of a development environment 100 that may be employed to generate a call graph corresponding to an application. In various embodiments, development environment 100 may be implemented with one or more computing devices configured in a variety of ways.

As illustrated, development environment 100 includes debuggee program 102, which is the computer program being debugged or analyzed. Debuggee program 102 includes machine code 112. This may be in the form of native code, intermediate language code, or another representation. In one embodiment, development environment 100 includes profiler 110. Profiler 110 is a component that may perform an analysis of machine code 112 and insert probes 114 into the machine code. A probe 114 includes one or more instructions that, when executed, cause a corresponding call trace event and provide data regarding the execution of machine code 112. This data may indicate that a particular location has been reached, or that a particular function is about to be called or has just returned. Various types of probes 114 may provide data indicating additional information. During an execution of a debuggee program 102, system functions, libraries, or other program segments that have not been generated from machine code may be invoked. As used herein, the debuggee program includes all functions that are invoked during execution of the debuggee program.

Table 1 includes examples of call trace probes and corresponding events that may be employed. For example, a "call" event may indicate that a function is about to be invoked. It may be triggered by a corresponding call probe, and indicate the calling function and the called function. A call probe may be inserted prior to the actual invocation code. An "enter" event may be inserted at or near the beginning of a function. It may be triggered by an "enter" probe, and indicate the function that has begun execution. An "exit" probe may be inserted prior to a function return. It may trigger an "exit" event indicating the function that is about to return. A "return" probe may trigger a "return" event, indicating the called function and the caller function. It may be inserted immediately after a function call, or approximately in that location. In various embodiments, other types of probes 114 may trigger corresponding events and provide other data.

TABLE 1

Call Trace Events

| Event | Probe | Data | Example Location of Probe |
|---|---|---|---|
| CALL | CALL PROBE | Caller, called function | Immediately before a function call |
| RETURN | RETURN PROBE | Caller, called function | Immediately after a function call |
| ENTER | ENTER PROBE | Current function | At the beginning of a function |
| EXIT | EXIT PROBE | Current function | Before each exit of a function |

In the illustrated embodiment, debuggee program 102 includes call stack 119. Call stack 119 is a run-time data structure that maintains data representing each function invoked during execution of debuggee program 102. It may include one or more frames, each frame representing an instance of an invoked active function. The sequence of frames indicates the sequence of invocations. In one invocation, the frames are ordered with the frame of the current function at the top of the stack.

As illustrated, development environment 100 includes development system 104. Development system 104 includes one or more computer programs and associated data that facilitate debugging of a debuggee program. Visual Studio, by Microsoft Corporation, of Redmond, Wash., is one example of a development system, though other development systems may be employed. Thus, various development systems may be enhanced to perform the mechanisms described herein.

In one embodiment, development system 104 includes a call graph 120 and shadow stack 122. A call graph is a directed graph that represents calling relationships between functions in a computer program. Each node of the graph represents a function, and each directed edge represents an invocation of the called function from the calling function. In one embodiment, call graph 120 is implemented as a tree structure or as a tree structure within a graph structure. Call graph 120 represents relationships between functions of debuggee program 102. Shadow stack 122 is a snapshot approximation of call stack 119 at a particular point during the execution of debuggee program 102. It may include data indicating an approximation of the sequence of frames in call stack 119 at a particular point, based on an analysis of logged events.

Figure 2:
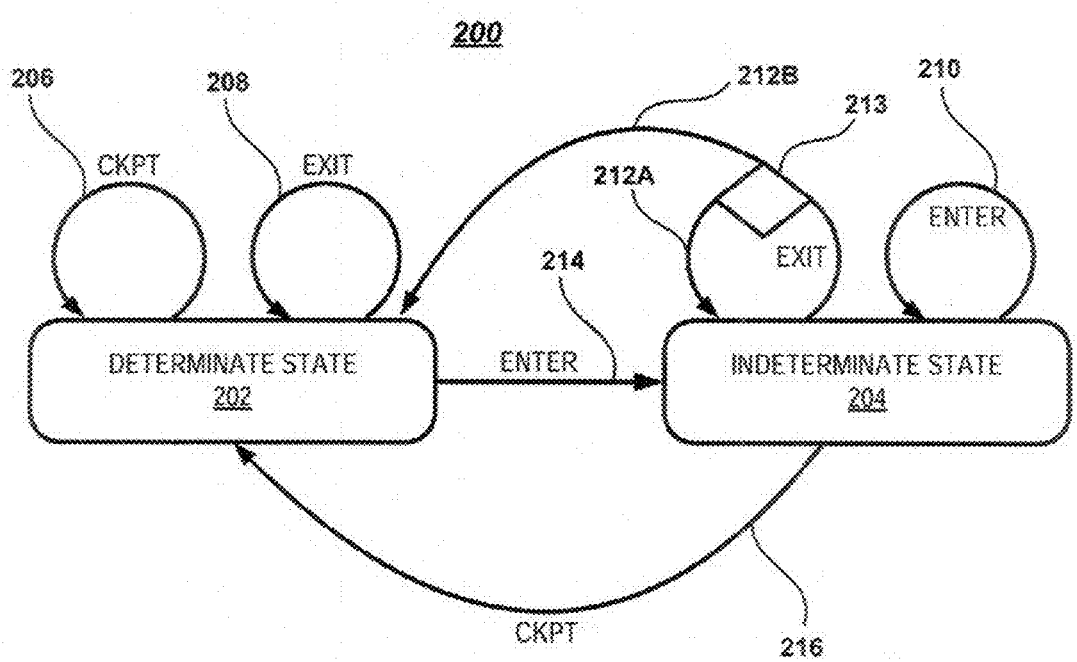
FIG. 2 illustrates a state machine that may be used to implement at least some of the mechanisms described herein.

In one embodiment, development system 104 includes state machine 126. State machine 126 represents a state of the analysis of debuggee program 102 based on a stream of events 130 received from logger 106. It may also indicate transitions between states, as well as the types of events that trigger state transitions. An example of a state machine 126 is illustrated in FIG. 2, and discussed in further detail herein. Briefly, state machine 126 may receive a stream of events 130 that includes call trace events and sample trace events previously logged, and updates call graph 120 and shadow stack 122 based on these events.

Figure 5:
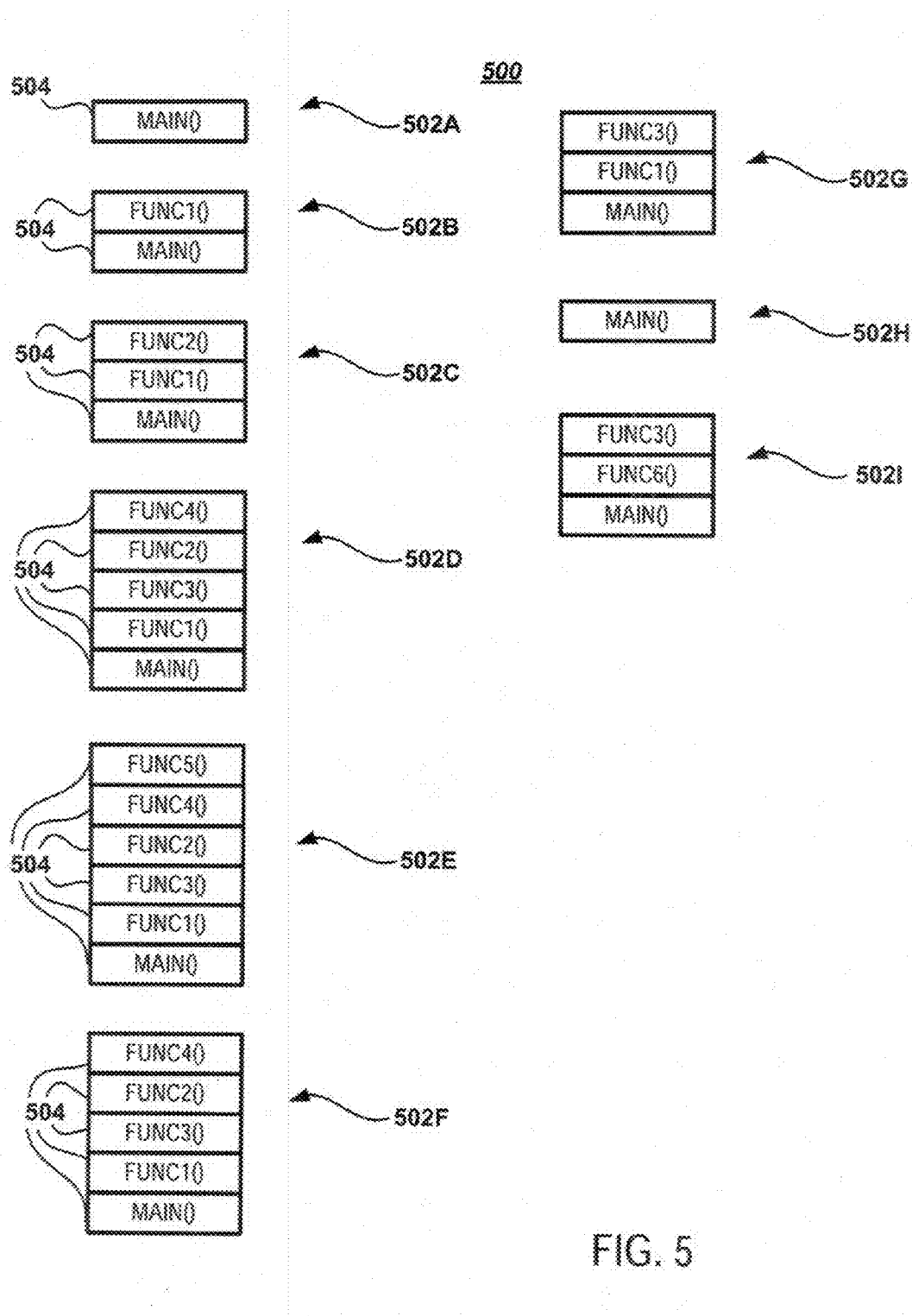
FIG. 5 illustrates an example of a sequence of shadow stacks that may be generated in response to the sequence of events of FIG. 3.
Figure 6A:
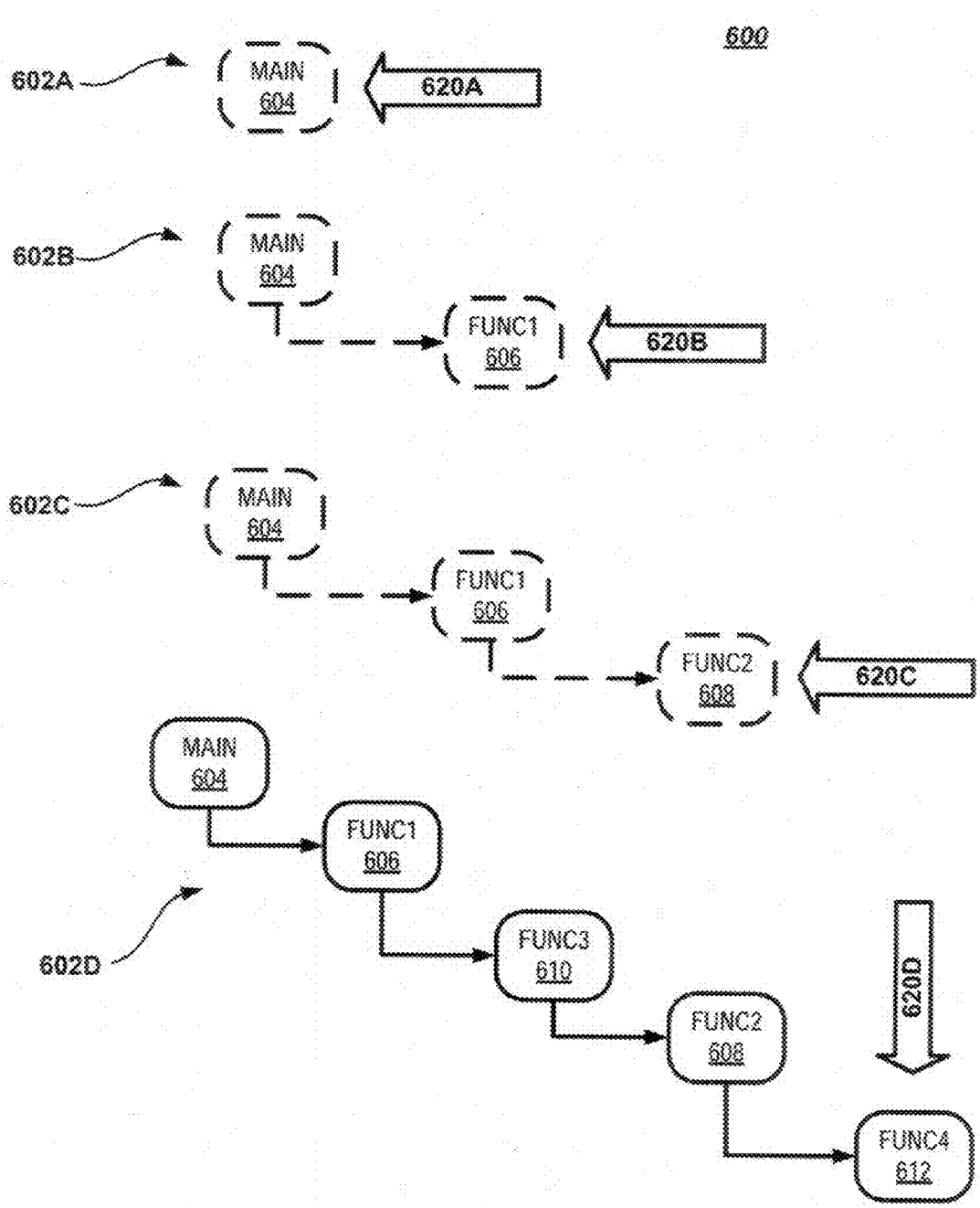
FIGS. 6A-C illustrate an example of a sequence of call graphs that may be generated in response to the sequence of events of FIG. 3.
Figure 6B:
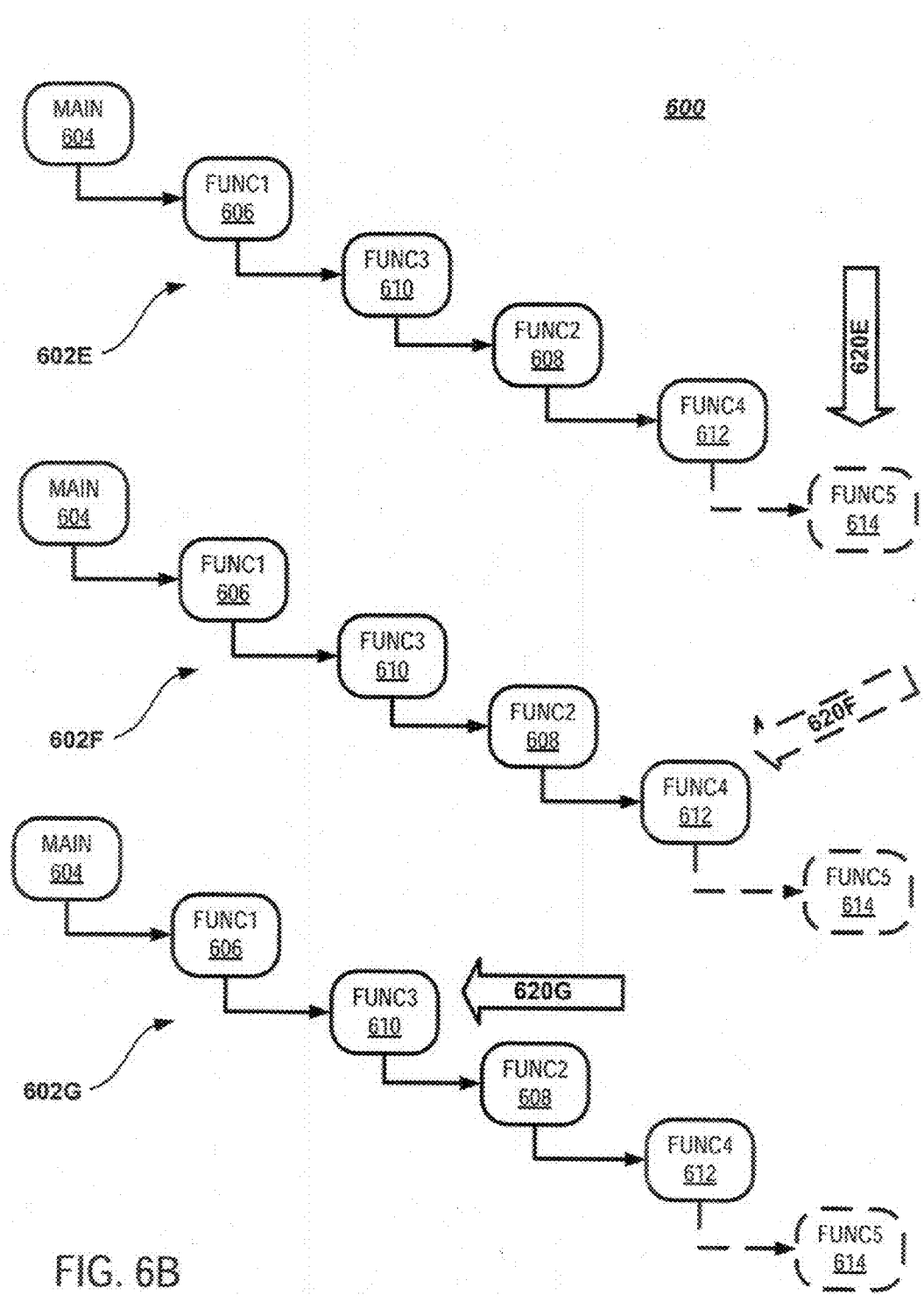
Figure 6C:
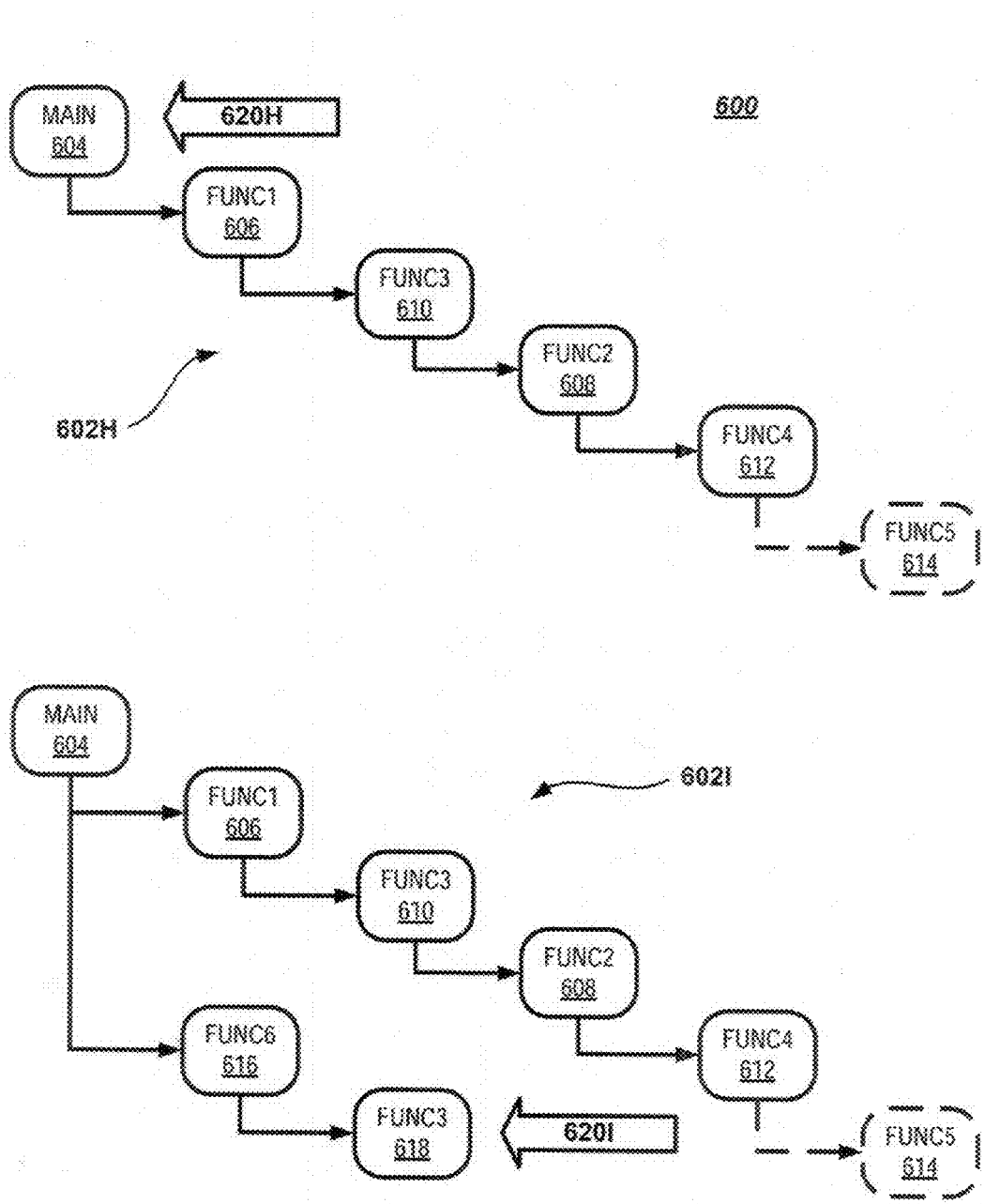

As discussed herein, when the analysis is in a determinate state, shadow stack 122 matches the data that call stack 119 had at a corresponding time during execution of debuggee program 102. When the analysis is in an indeterminate state, state machine 126 applies heuristics to match shadow stack 122 with call stack 119 at the corresponding point of execution, though differences may exist. Example call graphs are illustrated in FIGS. 6A-C. Example shadow stacks are illustrated in FIG. 5.

In one embodiment, development system 104 includes one or more samplers 124b. During execution of debuggee program 102, a sampler may cause an event that triggers a snapshot of call stack 119, enabling the snapshot to be stored in a log for use during a subsequent analysis. A sampler 124b may include program instructions or data that indicate when or how a CHECKPOINT event is to be triggered. One type of sampler may specify that a CHECKPOINT event is to be triggered based on a number of call trace events that have occurred. For example, it may indicate that a CHECKPOINT event is to be triggered after every 1000 call trace events, without a specification of a particular location in the debuggee program. One type of sampler may have a corresponding specification of a location in the debuggee program. It may be an unconditional sampler that causes an event every time the location is reached during debuggee program execution. It may be conditional, based on a number of times the location has been executed, values of one or more debuggee program variables, a number of call trace events, or other condition. Samplers may be created to trigger a CHECKPOINT event based on any of a number of program or system conditions, such as a call stack reaching a specified size, a specified system call being made, an amount of memory being allocated, or the like. One type of CHECKPOINT event may be triggered in response to an action by a user, such as pausing execution of debuggee program 102, or entering a command. In one embodiment, samplers have a component associated with development system 104, labeled as sampler 124b herein, and a corresponding component associated with debuggee program 102, labeled as sampler 124a herein. Sampler 124a may include instructions and data to trigger a CHECKPOINT event during execution of debuggee program 102. Sampler 124b may include instructions and data to facilitate configuration of a sampler, or control of sampler 124a.

In the illustrated embodiment, development environment 100 includes logger 106 and log 108. Logger 106 provides an interface to log 108. Logger 106 may receive events or data from debuggee program 102 and store the corresponding information in log 108. Logger 106 may receive requests for data and retrieve the requested data from log 108. Log 108 may be implemented as a database, a file, an event stream or queue, or another structure that provides storage and retrieval of data. The receipt of an event or data by logger 106 is referred to as "logging" the event or data.

As illustrated in FIG. 1A, in one embodiment, probes 114 may trigger corresponding call trace events 118. TABLE 1, discussed above, describes examples of call trace events 118 that may be triggered by corresponding probes 114. In one embodiment, logger 106 may receive each of these events and store the corresponding data to log 108. Samplers 124 may trigger CHECKPOINT events 128. In response to CHECKPOINT event 128, a snapshot of the call stack 119, or a portion thereof, may be taken and stored by logger 106.

Figure 3:
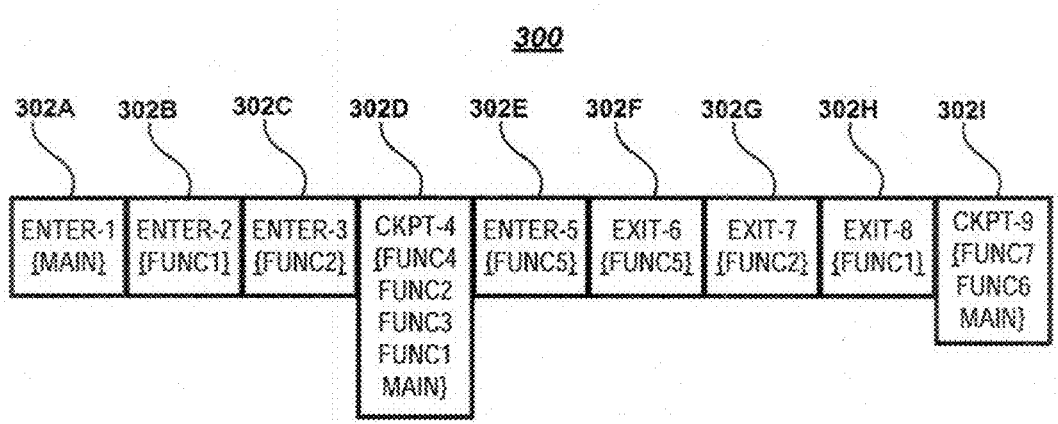
FIG. 3 illustrates an example of a sequence of events that may occur when employing at least some of the mechanisms described herein.

In one embodiment, logger 106 may maintain a temporal ordering of events. This may be implemented by storing a timestamp corresponding to each event. It may be implemented by maintaining a counter and incrementing it for each event. The ordering may be maintained by various other data or storage mechanisms. The ordering enables logger 106 to retrieve a set of events in their proper sequence, or to retrieve a set of events in a specified interval. FIG. 3 illustrates an example sequence of events, in which each event is numbered to illustrate a temporal ordering.

In one embodiment, development environment 100 includes user interface 140, which may be a graphical user interface or other type of interface. Call graph 120 or shadow stack 122 may be displayed as a portion of user interface 140.

Figure 11:
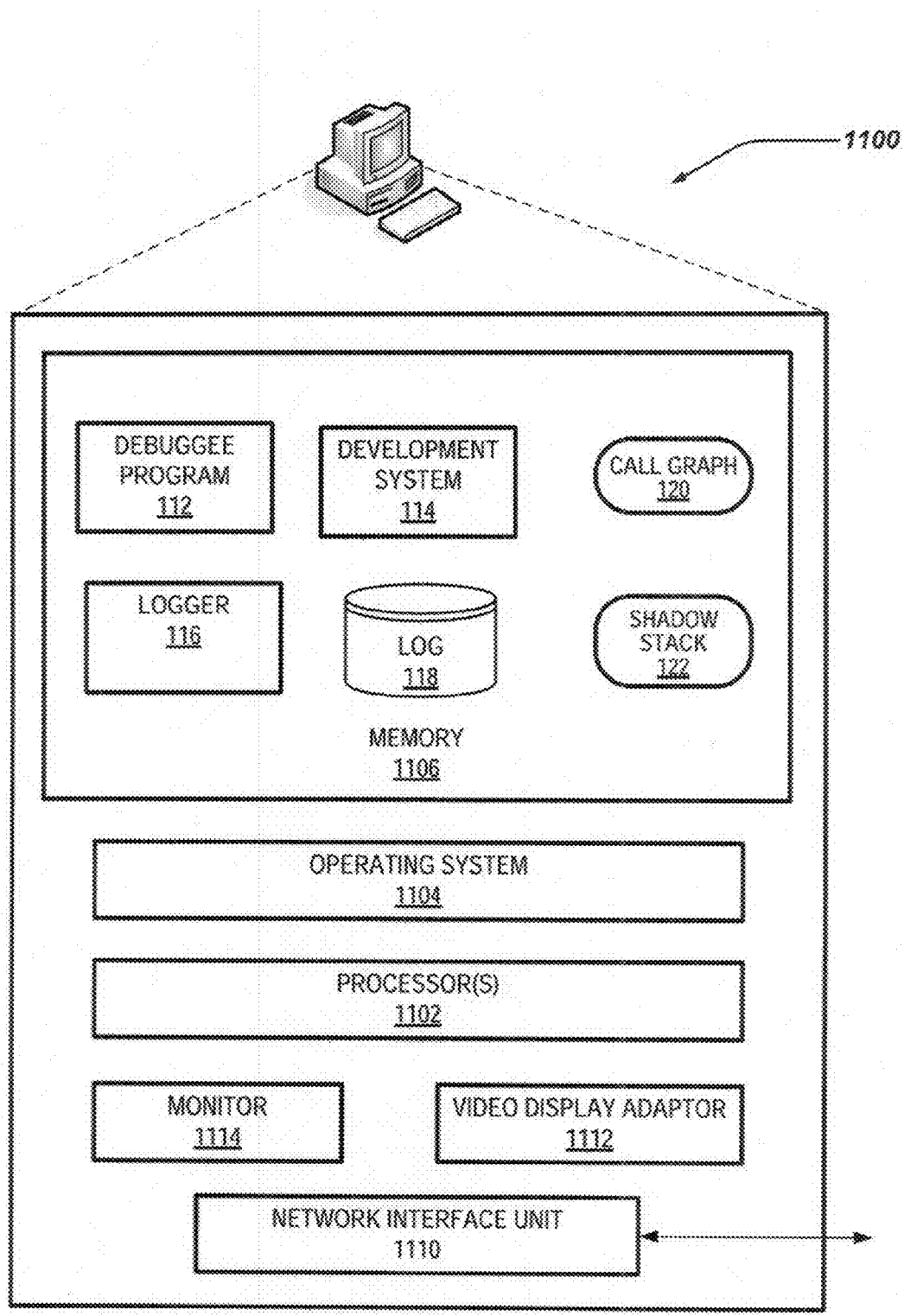
FIG. 11 is a block diagram of a computing device that may implement embodiments of the technologies described herein.

Portions of development environment 100 may be implemented as one or more computing devices, or as computer software executing on one or more computing devices. FIG. 11 illustrates one embodiment of a computing device that may be used to implement development environment 100 or portions thereof.

FIG. 1A is only an example of a suitable environment and is not intended to suggest any limitation as to the scope of use or functionality of the present invention. Thus, a variety of system configurations may be employed without departing from the scope or spirit of the present invention.

Figure 1B:
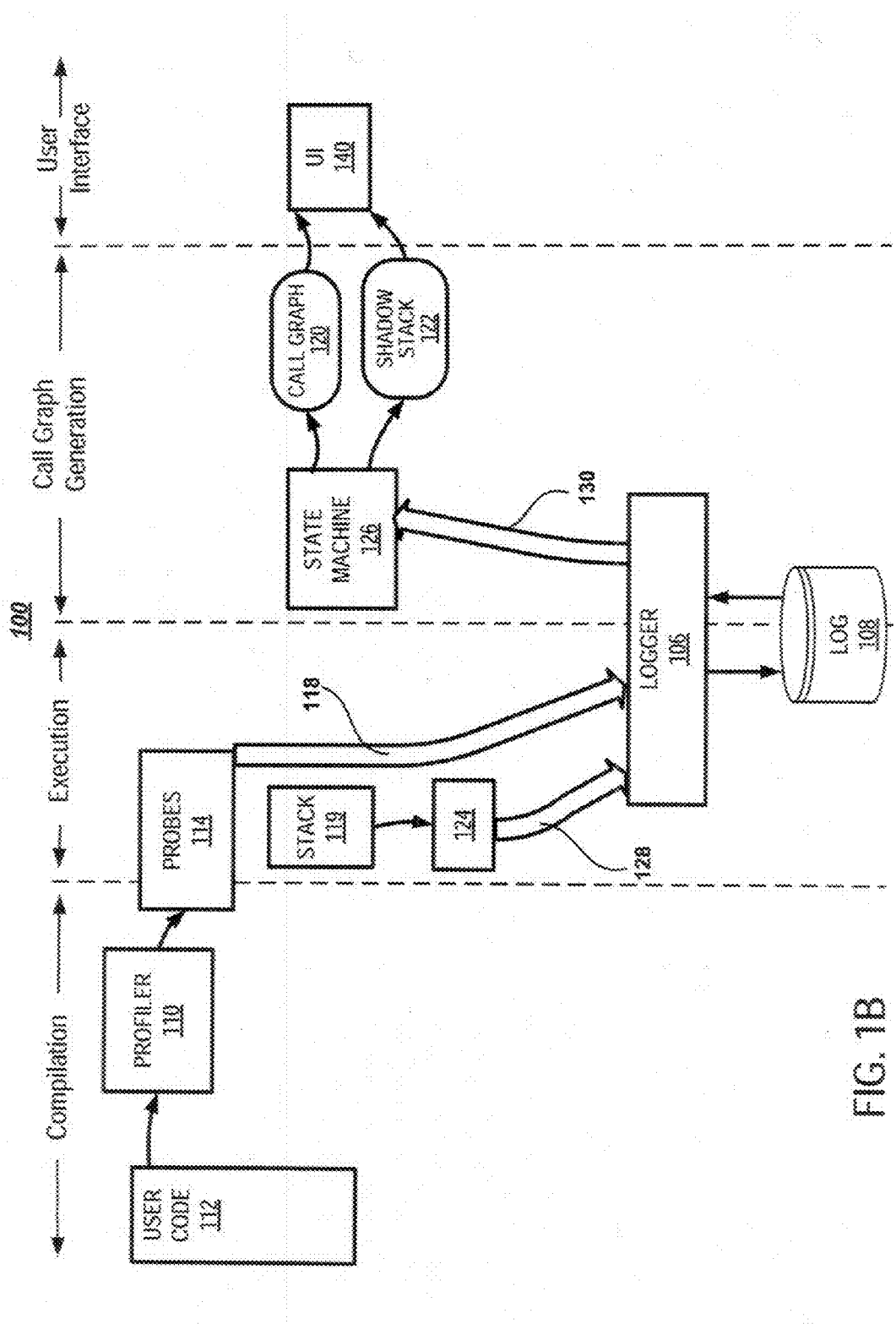
FIG. 1B is a timing diagram showing an example embodiment of the debugging system of FIG. 1A together with actions in multiple phases.

FIG. 1B is a timing diagram 150 illustrating the components of development environment 100 arranged to show a flow of actions and data movement. Timing diagram 150 is divided by vertical dashed lines into four sections, representing a compilation phase, an execution phase, a call graph generation phase, and a user interface phase. It is to be noted that in various embodiments, these phases may be in a different order, overlap, or iteratively transition between phases. However, for illustrative purposes, the system is shown in four distinct phases.

In a compilation phase, profiler 110 may process machine code 112 to insert probes 114, as discussed herein. In some embodiments, compilation may be performed in stages, or a just-in-time compilation may be performed such that probe insertion may occur just prior to the first execution of each function.

In an execution phase, machine code 112 may be executed, causing probes 114 to trigger call trace events 118. The data corresponding to call trace events may be sent to logger 106 for storage in log 108. Also during the execution phase, samplers 124 may trigger CHECKPOINT events 128, causing data from call stack 119 to be sent to logger 106 for storage. Call trace events 118 and CHECKPOINT events 128 that occur as part of the execution of machine code 112 are referred to as "runtime" events. During processing by the state machine after logging, these events are referred to as "logged" events, to clarify the distinction between handling an event during runtime and subsequent processing of the event when generating a call graph or shadow stack.

In a call graph generation phase, the logged events may be retrieved by state machine 126 to generate call graph 120 and shadow stack 122. Mechanisms for performing these actions are discussed in further detail herein.

In a user interface phase, a representation of the call stack or shadow stack may be displayed or otherwise presented to a user as part of user interface 140. UI 140 may include, for example, a display on a computer monitor. In some embodiments, these actions may be performed iteratively, such that a user may view the call graph or shadow stack at various times during execution of a debuggee program. In some embodiments, the execution of the debuggee program may be performed prior to beginning generation of the call graph or shadow stack. These phases may be controlled by one user or different users working sequentially or concurrently. In one embodiment, at least some of the actions of the state machine may be performed concurrently with execution of the debuggee program, so that portions of the call graph may be sent to logger 106 and written to log 108. For example, parent or child links between events may be logged during debuggee program execution.

FIG. 2 illustrates an embodiment of a state machine 200 that may be used to implement at least some of the mechanisms described herein. In one embodiment, state machine 200, or a variation thereof, may represent an example execution of state machine 126 of FIG. 1A or 1B. In the discussion that follows, references are made to components of FIGS. 1A-1B.

The example state machine 200 includes two states. Determinate state 202 is a state in which the system is confident of having a shadow stack 122 that is an accurate representation of call stack 119 for the corresponding point of debuggee program execution. This state occurs when state machine 126 has recently received a snapshot of the call stack, and it is known that the call stack has not changed or that a change can be accurately determined based on available data. Indeterminate state 204 occurs when the system is not in determinate state 202.

In one embodiment, the state machine 200 exists in either determinate state 202 or indeterminate state 204. It receives various logged events, optionally performs an action, and either transitions to the other state or transitions back to the same state. The latter type of transition is referred to as a "self-transition." The actions performed may include updating call graph 120 or shadow stack 122. In one implementation, events are received from log 108 via logger 106. They may be received sequentially, in the order of their timestamps. In one embodiment employing debug environment 100 of FIG. 1A, the events that are received may be ENTER events, EXIT events or CHECKPOINT events. However, in various embodiments, other types of events may be included. In embodiments with other types of events, the state machine may differ from example state machine 200.

In FIG. 2, transitions 206-216 are represented by arrows, and each transition is labeled as the type of event that triggered it. Thus, checkpoint self-transition 206 is triggered by a CHECKPOINT event received in determinate state 202. Exit self-transition 208 is triggered by an EXIT event received in determinate state 202. Enter transition 214 is triggered by an ENTER event received in determinate state 202.

Figure 4:
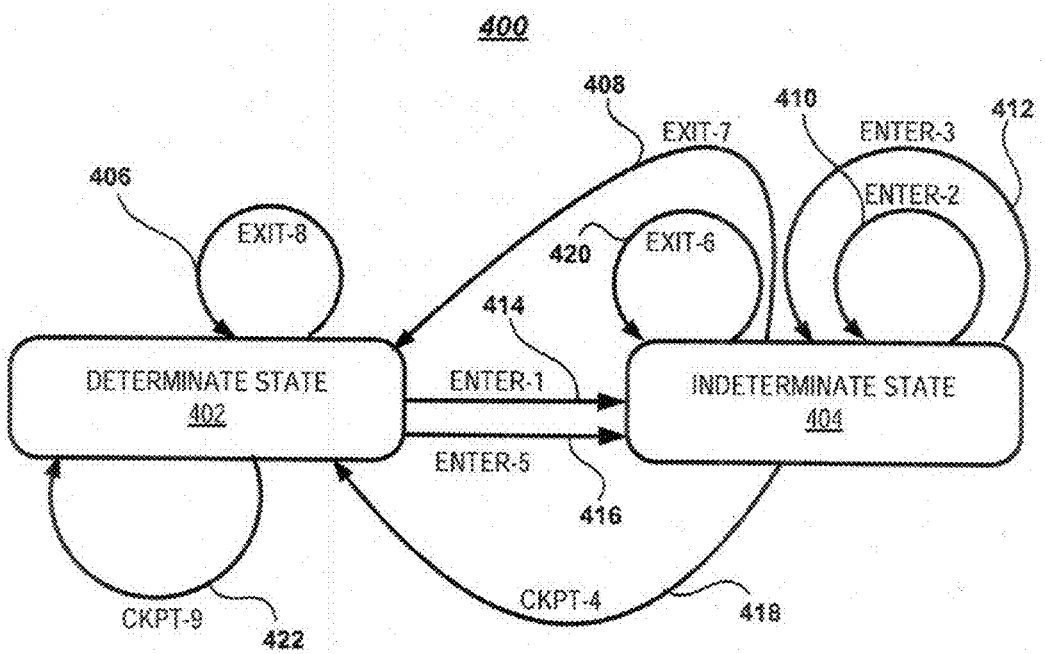
FIG. 4 illustrates an example of transitions that may occur in a state machine in response to the sequence of events of FIG. 3.

Enter self-transition 210 is triggered by an ENTER event in indeterminate state 204. Checkpoint transition 216 is triggered by a CHECKPOINT event received in indeterminate state 204. It transitions to determinate state 202. Transitions 212A and 212B are triggered by an EXIT event in indeterminate state 204. In one embodiment, the actions of these events result in data that indicates the subsequent transition. As illustrated, in this embodiment, either self-transition 212A or transition 212B to determinate state 202 may result from processing an EXIT event. This determination is illustrated and discussed in FIG. 4. Actions in response to each of the events illustrated in FIG. 2 are discussed in further detail herein. FIG. 4 provides an example of transitions in response to a specific example sequence of events.

FIG. 3 illustrates an example of a sequence of logged events that may result from execution of a debuggee program. The sequence of events may be a portion of the stream of events 130 received from logger 108 by state machine 126. Event sequence 300 is used to illustrate an example of the mechanisms described herein.

Event sequence 300 includes a sequence of events 302A-I. Each event 302A-I is labeled with the type of event (ENTER, EXIT, or CKPT) and displays, within brackets, at least a portion of data that may be included with the event. Each label includes a sequence number that indicates a temporal sequence of each event relative to the others. In this example, the sequence numbers range from one to nine. In various implementations, timestamps, pointers, or other indicators may be used to indicate a sequence. Events 302A, 302B, 302C and 302E are ENTER events. As described in Table 1 and elsewhere herein, an ENTER event may indicate that a function has been entered, and identifies the function. ENTER event 302A indicates that function main( ) has been entered; ENTER event 302B indicates that function func1( ) has been entered; ENTER event 302C indicates that function func2( ) has been entered; and ENTER event 302E indicates that function func5( ) has been entered. Though not illustrated, an ENTER event may indicate values of function parameters.

Each of events 302E, 302F, and 302I indicates that a function is about to exit, and identifies the function. EXIT event 302F indicates that function func5( ) is about to exit; EXIT event 302G indicates that function func2( ) is about to exit; EXIT event 302H indicates that function func1 is about to exit. Though not illustrated, an EXIT event may include a return value of the associated function.

It is to be noted that the event sequence 300 actually represents two corresponding time intervals. In this example, each event in the event sequence 300 occurs during the execution phase of FIG. 1B. During the call graph generation phase of FIG. 1B, each event is received and processed. Thus, a reference to an event during the graph generation phase may describe a corresponding state or action that occurred during the execution phase. For example, an EXIT event received during the call graph generation phase may be described as representing a function that is about to exit, though during the call graph generation phase the actual execution, and the function exit, has already occurred. Similar references are made herein when describing the shadow stack or call graph.

CHECKPOINT events 302D and 302I indicate that a checkpoint has occurred. Each has a corresponding snapshot of the call stack as it exists at the time of the checkpoint. In the example of FIG. 3, CHECKPOINT event 302D indicates that the call stack included functions main( ), func1( ), func3( ), func2( ), and func4( ), in order from the bottom to the top of the stack; CHECKPOINT event 302I indicates that the call stack included functions main( ), func6( ), func7( ) in order from the bottom to the top of the stack. Event sequence 300 is used herein in conjunction with FIGS. 4, 5, and 6A-C to illustrate mechanisms of generating a call graph and shadow stack.

FIGS. 4-6 illustrate an example of mechanisms for generating a call graph based on the example event sequence 300 of FIG. 3. FIG. 4 provides an example of state machine transitions based on event sequence 300.

FIG. 5 illustrates an example sequence of shadow stacks 502A-I that may be generated based on event sequence 300. Each shadow stack 502A-I is a particular configuration of shadow stack 500 at a point in generating and updating shadow stack 500. Each event 302A-I has a corresponding shadow stack 502A-I. Each shadow stack includes one or more frames 504, each frame corresponding to an active instance of a function. An active instance of a function is a function instance that is currently in a state of execution.

A shadow stack may be implemented as an ordered array of frames and an associated top-of-stack pointer, or by various other implementations that represent a stack. "Deleting" or "removing" a frame from the top of the stack may be implemented by modifying the top-of-stack pointer to point to the next frame down the stack. Thus, deleting a frame does not necessarily include deallocation of memory or erasing the frame from memory, though in some implementations it may. Deleting the top frame from a stack may be referred to as "popping" the frame from the stack. Though a stack may be implemented in various ways, "deleting" and "removing" a frame are used synonymously herein, regardless of implementation.

FIGS. 6A-C illustrate an example series of call graphs 602A-I that may be generated based on event sequence 300. Each call graph 602A-I is a particular configuration of call graph 600 at a point in generating and updating call graph 600. Each example call graph 602A-I forms a tree structure, in which each non-root node has exactly one parent node. However, in some embodiments, structures other than trees may be employed. It is to be understood that there are numerous ways to implement a tree structure. For example, two or more subtrees may be separately maintained, though they logically form a single tree. Reference to a tree or graph structure herein is intended to include the various implementations of such a structure.

Each call graph 602A-I includes a cursor 620A-I that points to the "current node" of the call graph. The current node is the node corresponding to the function that includes the current point of execution. The current node and all of its ancestors are referred to as active nodes, corresponding to the active functions. When the various structures are synchronized, the active function is the function represented by the top frame of the shadow stack or call stack, and the sequence from the call graph root to the current node matches the frames of the shadow stack. Each event 302A-I has a corresponding call graph 602A-I that indicates the state of the call graph after the event has been processed during call graph generation. The discussion that follows references each of these figures.

FIG. 4 includes state machine 400, which may represent an example of state machine 126. It includes a transition corresponding to each event 302A-I of FIG. 3. FIG. 4 provides an example of state machine 200 of FIG. 2, as applied to a specific event sequence, in an example embodiment. In one embodiment, state machine 400 is initialized to be in determinate state 402 or, in this example, may be in determinate state 402 as a result of prior events that are not illustrated. In response to receiving ENTER-1 event 302A, state machine 400 may perform some actions and transition to indeterminate state 404, as illustrated by transition 414. The actions may include updating shadow stack 500 and call graph 600. More specifically, ENTER-1 event 302A includes data of a new current function, main( ). Therefore, main( ) is pushed onto a previously empty shadow stack, resulting in shadow stack 502A. The call graph is updated to reflect main( ) as the first function to be entered, as in call graph 602A, with node MAIN 604 and cursor 620A.

In FIGS. 6A-C, each node is marked to indicate whether it is a determinate node or an indeterminate node. A node is determinate if it may be inferred that the ordered list of nodes leading to it from the root is correct. If a node is not determinate, it is considered to be indeterminate. Indeterminate nodes are indicated by a dashed line; determinate nodes are indicated by a solid line. As state machine 200 shows, when an ENTER event is received, the system does not know whether one or more other functions without ENTER events preceded it. Thus the state machine transitions to an indeterminate state and the new node is represented as indeterminate.

Cursors 620A-I are also marked as determinate or indeterminate, as indicated by a solid line or a dashed line, respectively. A determinate cursor indicates that the system infers that the node it points to is the correct current node. As indicated by cursor 620A, after receiving an ENTER event, the cursor is considered to be determinate, in the example embodiment. Thus, a cursor may be determinate, though the current node is indeterminate and the current state is indeterminate.

In response to receiving ENTER-2 event 302B, state machine 400 may perform actions and self-transition to indeterminate state 404, as illustrated by self-transition 410. The actions may include updating shadow stack 500 by pushing func1( ) onto it, resulting in shadow stack 502B. The call graph is updated to indicate the func1( ) call, as in call graph 602B, with new node FUNC1 606. Cursor 620B is modified to point to FUNC1 node 606, which is now the current node. In a manner similar to that described for event 302A, FUNC1 node 606 is marked as indeterminate and cursor 620B is marked as determinate.

In response to receiving ENTER-3 event 302C, state machine 400 may perform actions and self-transition to indeterminate state 404, as illustrated by self-transition 412. The actions may include updating shadow stack 500 by pushing func2( ) onto it, resulting in shadow stack 502C. The call graph is updated to indicate the func2( ) call, as in call graph 602C, with new indeterminate node FUNC2 608. Cursor 620C is modified to point to FUNC2 node 608, which is now the current node. Cursor 620C is marked as determinate.

As discussed herein, in indeterminate state 404, there is uncertainty as to the accuracy of the call graph and shadow stack. For example, there may be one or more non-instrumented functions, which do not include ENTER or EXIT probes, that have been invoked. In some embodiments, the state machine does not receive events to indicate that non-instrumented functions have been invoked. CHECKPOINT-4 event 302D illustrates a mechanism for transitioning from an indeterminate state to a determinate state. In one embodiment, a CHECKPOINT event corresponds to a snapshot of call stack 119. In response to receiving CHECKPOINT-4 event 302D, state machine 400 may perform actions and transition to determinate state 402, as illustrated by transition 418. The actions may include updating shadow stack 500 by inserting or deleting call frames to match the snapshot data. In this example event sequence 300, the snapshot data of CHECKPOINT-4 event 302D contains the sequence main( )|func1( )|func3( )|func2|func4( ). It may be noted that func3( ) and func4( ) are not included in shadow stack 602C or call stack 602C. This may have occurred because they are non-instrumented functions. In response to receiving this CHECKPOINT event 302D, func3( ) and func4( ) may be inserted into shadow stack 500 based on the sequence ordering as indicated in the CHECKPOINT-4 event 302D, resulting in shadow stack 502D showing func4( ) as the current function.

The call graph is updated by inserting FUNC3 node 610 between FUNC1 node 606 and FUNC2 node 608 to indicate the missing func3( ) call. FUNC4 node 614 is inserted after FUNC2 node 608, and becomes the current node. Cursor 620D is set to point to FUNC4 node 614. The result may be seen in call graph 602D, with cursor 620D. As illustrated, in response to a CHECKPOINT event, all active nodes in the call graph are considered to be determinate, as is the cursor.

Thus, the heuristics employed by state machine 400 may insert one or more missing frames into the shadow stack and corresponding one or more missing nodes into the call graph at positions based on the checkpoint snapshot of the call stack. It is to be noted that, though this example illustrates two frames inserted into the shadow stack and two nodes inserted into the call graph, in various other situations, any number of frames and nodes may be so inserted in response to a CHECKPOINT event. In response to a CHECKPOINT event, multiple frames or nodes may be inserted that are contiguous or not contiguous with each other. As discussed herein, in some situations, shadow stack frames may be deleted in response to receiving a CHECKPOINT event, or inactive nodes may be made to be active nodes. Further, in this example event sequence 300, a change to the cursor 620D was made. However, some checkpoints may result in the current node remaining as the current node, though it may become determinate.

In response to receiving ENTER-5 event 302E, state machine 400 may perform actions and transition to indeterminate state 404, as illustrated by transition 416. The actions may include updating shadow stack 500 by pushing the func5( ) frame onto it, resulting in shadow stack 502E. The call graph is updated by adding new node FUNC5 614 as the current node, and modifying cursor 620E so it points to this node. As discussed above, in this example embodiment, in response to an ENTER event, the new node is marked as indeterminate and the cursor is marked as determinate.

In response to receiving EXIT-6 event 302F, state machine 400 may perform actions and self-transition to indeterminate state 404, as illustrated by self-transition 420. The actions may include determining a number of frames to pop from the shadow stack. In this example, it may be determined that the frame 504 corresponding to the func5( ) function is at the top of the stack. Therefore, this is the only frame that is popped from the stack. The call graph is updated by modifying the cursor to point to the parent node of the node that corresponds to the EXIT event function. In this example, the parent node is FUNC4 node 614. Cursor 620F therefore points to this node.

Though FUNC4 node 614 is determinate, cursor 620F remains indeterminate. This is because, though node 614 is the system's "best guess" as to the current node, it does not infer that this is accurate. There may be a non-instrumented function that was invoked between CHECKPOINT event 302D and ENTER event 302E. Therefore, though cursor 602F points to FUNC4 612, the cursor remains indeterminate.

In response to receiving EXIT-7 event 302G, the shadow stack and call graph may be updated to the configuration illustrated by shadow stack 502G and call graph 620G, respectively. The actions for handling this EXIT event are similar to those described for handling the EXIT-6 event 302F, with some differences due to the existing states and configuration. In one embodiment, the actions of updating the shadow stack in response to an EXIT event include searching from the top of the stack until the corresponding frame is found, determining that the corresponding frame and any frames above it correspond to functions that have exited, and popping those frames from the stack. For example, when determining a number of frames to pop from the shadow stack, a search of the stack beginning at the top may determine that the frame 504 representing func2( ) is not at the top of the stack. It may be inferred that function func4( ) corresponding the frame above the func2( ) frame has exited, though there has not been a corresponding EXIT event. Therefore, the frame and the one above it (representing func4( )) are both popped from the stack. Similarly, it may be determined by searching the current node and its ancestors, that FUNC2 node 608 and its child node, FUNC4 node 612 are to be made inactive nodes. Therefore, cursor 620G is set to point to the parent of FUNC2 node 608, which is FUNC3 node 610 in this example.

The node corresponding to the exiting function, FUNC2 node 608, is a determinate node. In one implementation, in an indeterminate state, when a node corresponding to an exiting function is determined to be a determinate node, the state machine transitions into determinate state 402, as indicated by transition 408. As indicated by call graph 602G, the system may infer that, because a determinate node exiting node had a corresponding EXIT event, all active nodes are determinate and that the cursor is determinate. This contrasts with the configuration of call graph 602F, in which the cursor is indeterminate, allowing for a possibility of a non-instrumented node as the current node. Thus, the processing of an EXIT event in an indeterminate state may be based on the status of the call graph, or more specifically, the status of the node corresponding to the EXIT event.

In response to receiving EXIT-8 event 302H, state machine 400 may perform actions and self-transition to determinate state 402, as illustrated by self-transition 406. The actions may be similar to those described for the handling of the EXIT-7 event 302G, and include searching the shadow stack to find the frame corresponding to the exiting function, updating shadow stack 500 by popping the func3( ) and func1( ) frames from it, resulting in shadow stack 502H. The call graph is updated by modifying the cursor so it points to the parent node of the exiting current node, the parent node becoming the new current node. In this case, the cursor is modified to point to MAIN node 610, corresponding to function main( ) and the main( ) frame at the top of the shadow stack 502H. Call graph 602H and cursor 620H show the modified cursor 620H, which remains determinate.

CHECKPOINT-9 event 302I provides another snapshot of the call stack. In response to receiving this event, state machine 400 may perform actions including applying heuristics to update the shadow stack or call graph based on the call stack snapshot. In this example, it may be determined that a frame corresponding to func6( ) and a frame corresponding to func3( ) are missing, and corresponding nodes on the call graph are also missing. The actions may thus include pushing a new func6( ) frame and a new func3( ) frame onto the shadow stack, the latter becoming the top frame of the stack. The actions may also include adding a new FUNC6 node 616 as a child of the current node, which is MAIN node 604, and a new FUNC3 node 618 as a child of FUNC6 node 616, as shown in call graph 602I. FUNC3 node 618 becomes the new current node. Therefore, the cursor is updated to point to this node, as illustrated by call graph 602I and cursor 620I. In response to the checkpoint, the newly added nodes and the cursor are determinate. State machine 400 may self-transition to determinate state 402, as illustrated by transition 422.

It is to be noted that FUNC3 node 618 and FUNC3 node 610 each correspond to a different instance of the function func3( ). A call graph may represent any number of instances of each function. When a debuggee program includes direct or indirect recursion, any number of instances may be concurrently active. The mechanisms described herein may be applied to recursive programs. In such a program, a shadow stack may have a frame corresponding to each instance of a recursive function; a call graph may have an active node corresponding to each instance of the recursive function. When an EXIT event is handled for a function, a state machine may assume that the topmost frame corresponding to an instance of the function corresponds to the instance of the function being exited, and that the corresponding node of the call graph is the one that is to be removed from the active list.

Each call graph 602A-I includes a set of nodes that form an ordered list ending with the current node. The nodes of this list are active nodes, and correspond to the frames of the shadow stack as they are known. For example, in call graph 602I, the set of nodes MAIN node 604, FUNC6 node 616, and FUNC3 node 618 form an ordered list of active nodes, each node having a corresponding frame in shadow stack 502I. The remaining nodes are historic nodes in that each one was at some point an active node, but is no longer active. At a checkpoint, the ordered list of active nodes, like the shadow stack, is considered to be accurate.

In some embodiments, a user interface may present call graph 602 or shadow stack 502 in a variety of ways. For example, various formatting or labels may be used to indicate active nodes, determinate nodes, or whether the cursor is determinate.

Table 1 describes CALL and RETURN events, in addition to ENTER and EXIT events. In some embodiments, CALL and RETURN events may be used instead of ENTER and EXIT events. In one embodiment, a CALL event may be processed as described for an ENTER event. However, since a call probe is located within a calling function and describes the called function, the shadow stack and the call graph in an indeterminate state may differ. A CALL event may indicate a non-instrumented function that is called from an instrumented function. Also, an instrumented function that is called from a non-instrumented function may not have an event indicating that it was called. In one example, there may be instrumented functions I1 and I2, and non-instrumented functions N1 and N2, and a calling sequence of I1|N1|N2|I2. An embodiment that employs ENTER and EXIT probes may have an indeterminate state shadow stack with the sequence I1|I2, and a corresponding call graph with corresponding nodes. An embodiment that employs CALL and RETURN probes may have an indeterminate state shadow stack with the sequence I1|N1, and a corresponding call graph. The mechanisms of both embodiments may be similar, however.

In one embodiment, CALL and RETURN events are used in combination with ENTER and EXIT events. When an instrumented function invokes an instrumented function, there may be both a CALL and an ENTER event. Logic may therefore be included when handling the ENTER event to recognize this, in order to avoid inserting a redundant frame on the shadow stack and node in the call graph. For example, the CALL and ENTER events may include enough information, such as addresses of the called or entered function, to facilitate recognizing corresponding events. Similar logic may be used for corresponding EXIT and RETURN events. However, a CALL event without a corresponding ENTER event may be recognized as an instrumented function calling a non-instrumented function, when the events include information to facilitate recognition of this. An ENTER event without a corresponding CALL event may be recognized as a non-instrumented function calling an instrumented function. This facilitates additional accuracy at the borders between instrumented and non-instrumented code. Similar logic may be used for an EXIT event or a RETURN event without the corresponding event. In the example described above with a calling sequence of I1|N1|N2|I2, such an embodiment may have an indeterminate state shadow stack with the sequence I1|N1|I2, and a corresponding call graph with corresponding nodes.

In some embodiments, a state machine that receives CALL events may employ different transition logic. When in a determinate state 202 (FIG. 2), a state machine that receives a CALL event may determine to self-transition to the determinate state 202. In one implementation, the state machine may compare the function address in the CALL event with the function address in the ENTER event to determine whether the calling function directly called the entered function. It may infer that in such a situation, there is not an active non-instrumented function prior to the called function. In various embodiments, there may be other variations in the logic employed by the state machine.

Though not illustrated by the example event sequence 300, some event sequences may cause one or more nodes in the call graph to be made inactive in response to receiving a CHECKPOINT event. For example, if a CHECKPOINT event containing a snapshot of main( )|func1( )|func3( )|func2( )|func 3( ) was received following CHECKPOINT event 302D, this would indicate that func4( ) exited and another instance of func3( ) was invoked. The shadow stack 300 would be updated to reflect this. A new node representing the instance of func3( ) would be added to the call graph as a child of FUNC2 node 608 and sibling of FUNC4 612. The cursor would be set to point to this new node. Thus, nodes may be added to or deleted from the call stack in response to receiving a CHECKPOINT event and its snapshot.

Figure 7:
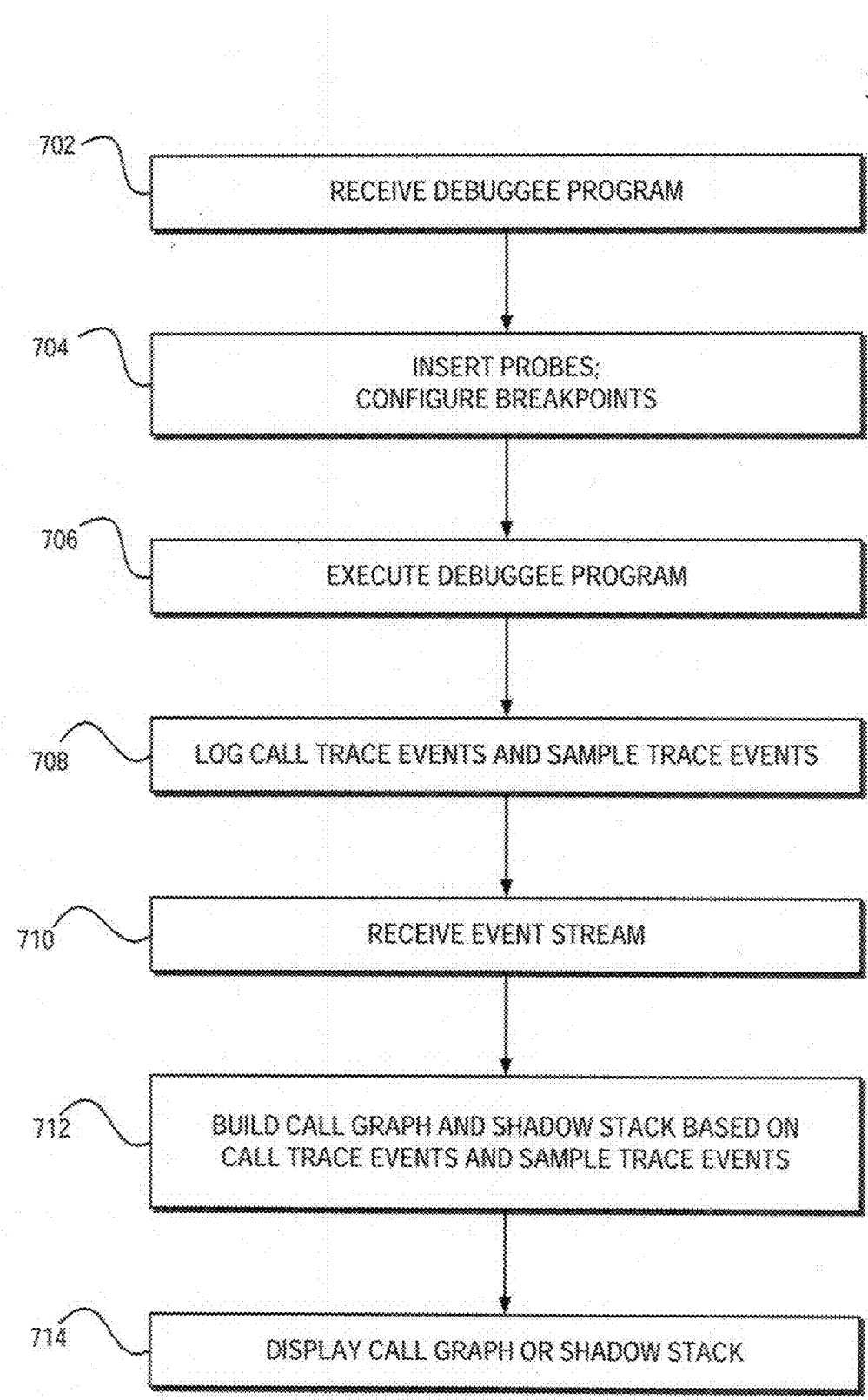
FIG. 7 is a flow diagram illustrating an example embodiment of a process for debugging a computer program.

FIG. 7 is a flow diagram illustrating an example embodiment of a process 700 for debugging a debuggee computer program. In one embodiment, the actions of process 700, or a portion thereof, are performed by development system 104 of FIG. 1.

Though the actions of process 700 are illustrated and discussed as distinct blocks, it is to be noted that in various implementations, any one or more of the actions of these blocks may occur concurrently, overlap, or be performed iteratively. However, for clarity of presentation, they are presented as sequential operations.

The illustrated portions of process 700 may be initiated at block 702, where a debuggee program is received. The debuggee program may be in the form of one or more computer files or data structures. It may be in an intermediate language, an interpretable language, native code, or other representation.

The process may flow to block 704, where probes may be inserted into the debuggee program. This may be performed, for example, by profiler 110 performing an analysis of the program and inserting probes at configured locations. The actions of block 704 may also include configuring breakpoints. A breakpoint is a signal that instructs the debugger to suspend execution of the debuggee program at a certain point. The actions of block 704 may include configuring a location in the debuggee program or conditions to trigger a breakpoint. In some embodiments, when execution of the debuggee program is suspended due to a breakpoint, a CHECKPOINT event is triggered.

The process may flow to block 706, where the debuggee program, or a portion thereof is, executed. The process may flow to block 708, where call trace events and sample trace events that occur during execution are processed and logged. Each event may have included or associated data that is logged, such as function identifiers, variable values, timestamps, or the like. In one embodiment, each event is logged with a timestamp or value that can be used to serialize the events in an ordering corresponding to the occurrence of the events. In one embodiment, portions of a call graph may be generated at block 708 and logged for later use by the state machine.

The process may flow to block 710, where an event stream may be received. This may be in the form of a computer file, a stream between processes, pointers to data, or other mechanism in which a reader process receives the events that were logged at block 708. The event stream may be event stream 130 of FIGS. 1A-B. It may include the example logged event sequence 300 of FIG. 3.

The process may flow to block 712, where a call graph may be generated based on the call trace events and sample trace events that were logged at block 708. The actions of block 712 may include generating a shadow stack based on the call trace events and sample trace events. The actions of block 712 are illustrated and discussed in further detail in FIGS. 8 and 9.

The process may flow to block 714, where the generated call graph or shadow stack may be displayed or otherwise presented to a user. This may be in any of a variety of formats and may employ any of a number of presentation mechanisms, including display on a monitor, printing, or speech presentation. The process may exit or perform additional iterations of any of the illustrated actions.

Figure 8:
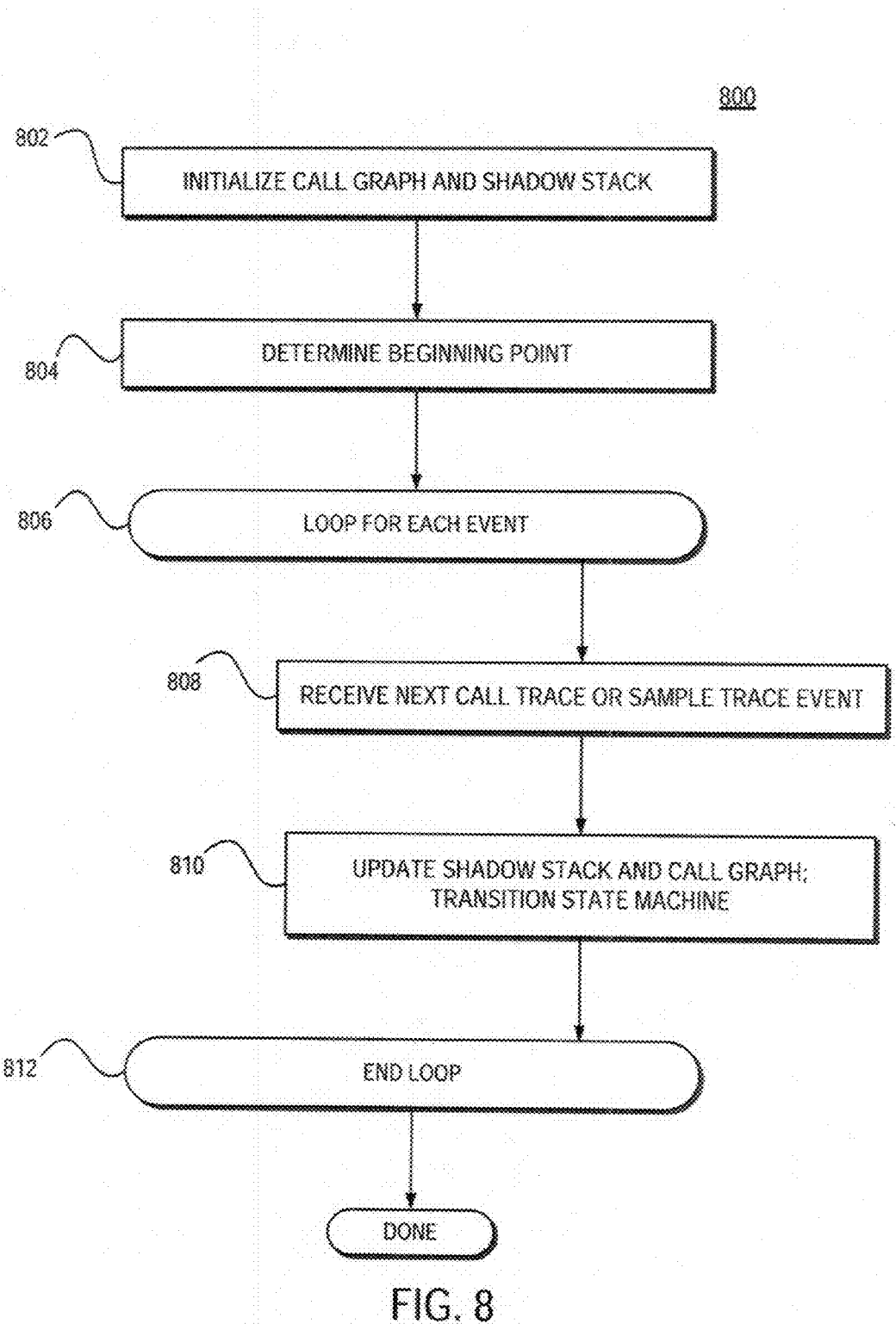
FIG. 8 is a flow diagram illustrating an example embodiment of a process for generating a call graph.

FIG. 8 is a flow diagram illustrating an example embodiment of a process 800 for generating a call graph. In one embodiment, process 800, or a variation thereof, may be used to implement the actions of block 712 of FIG. 7.

Process 800 may begin at block 802, where a call graph and a shadow stack are initialized. These may be call graph 120 and shadow stack 122 of FIGS. 1A-B, respectively. The call graph and shadow stack may be initialized to be empty or to include data received or generated from a previous iteration of process 800 or another process.

Process 800 may flow to block 804, where a beginning point in an event stream may be determined. In one embodiment, this may be at the first received event. In one embodiment it may be at the first received checkpoint or another checkpoint. By beginning at a checkpoint, the system can build a call graph that includes functions active at the checkpoint plus subsequent invoked functions. In one embodiment, a user may specify a beginning point or it may be configured in another manner.

Figure 9:
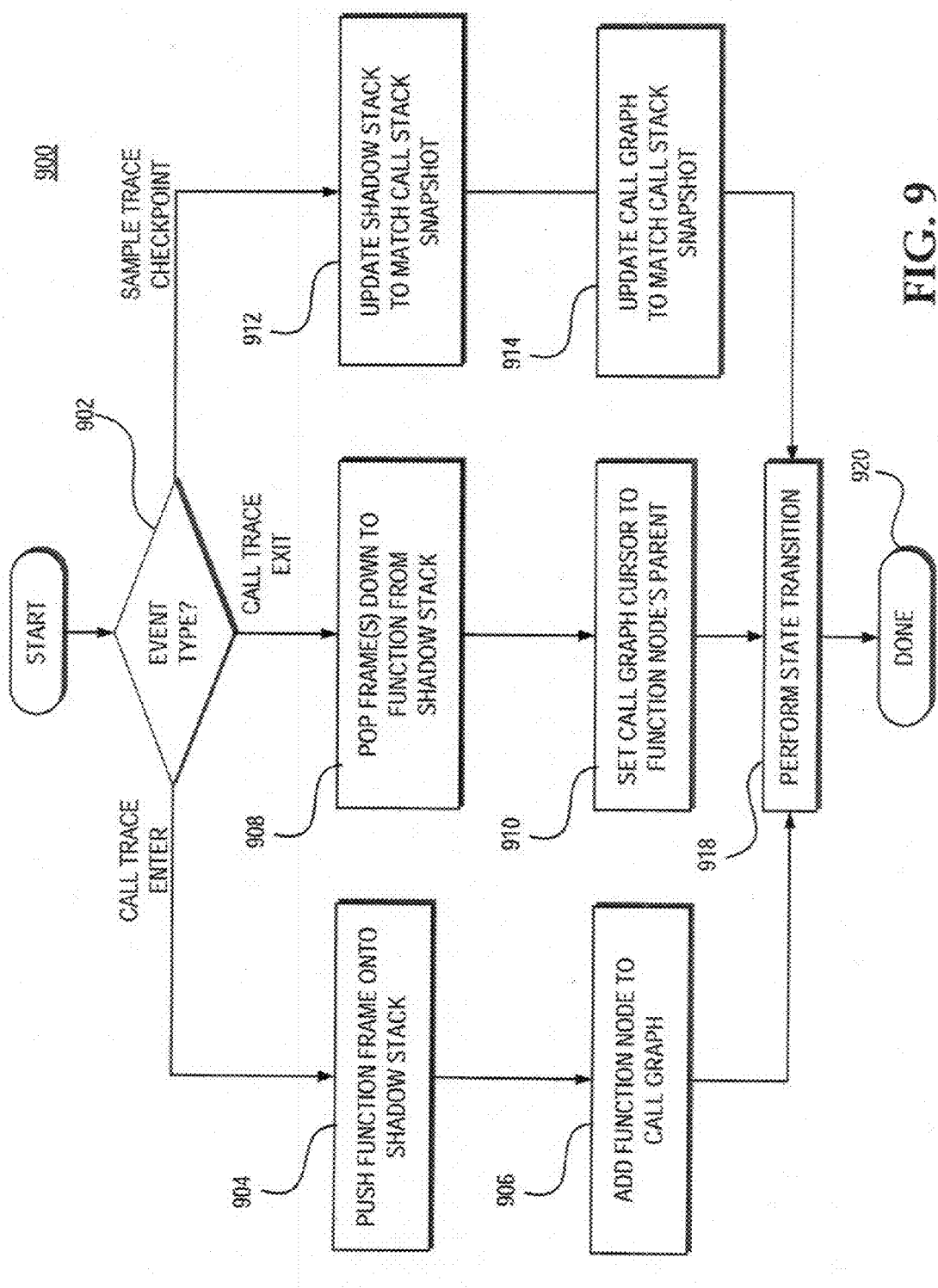
FIG. 9 is a flow diagram illustrating an example embodiment of a process for handling call trace events and sample trace events.

The process may flow to loop 806. Loop 806 begins a loop that iterates for each received event. The events may be call trace events or sample trace events. The loop includes blocks 808 and 810, and is terminated by block 812. At block 808, a next call trace event or sample trace event is received. In one embodiment, call trace and sample trace events are merged and received in the sequence in which they occurred. The process may flow to block 810, where the shadow stack or the call graph may be updated based on the received event. FIG. 9 illustrates an example implementation of handling an event and updating the shadow stack or call graph.

The process may flow to block 812, where loop 806 is terminated. Loop 806 may continue iterating until there are no more events to process, a specified exit point is reached, or an exit is performed based on a user action or based on another action. In one embodiment, the process may include logic to exit loop 806 at a CHECKPOINT event so that the final state of the shadow stack is accurate. In one embodiment, the process may include logic to exit loop 806 when the state machine is in a determinate state. Upon exiting loop 806, the process may exit or return to a calling program, such as process 700.

FIG. 9 is a flow diagram illustrating an example embodiment of a process 900 for handling a logged call trace or sample trace event to generate a call graph or shadow stack. In one embodiment, process 900, or a variation thereof, may be used to implement the actions of block 810 of FIG. 8, or a portion thereof.

Process 900 may begin, after a start block, at decision block 902, where a determination is made of the type of event that is being processed. FIG. 9 illustrates a handling of one of three types of events: an ENTER event, an EXIT event, or a CHECKPOINT event. These events, discussed elsewhere herein, provide examples of mechanisms of the process. In various embodiments, other types of events may be used in addition to, or in place of, any of these events.

If, at decision block 902, it is determined that the event is an ENTER event, the process may flow to block 904. An ENTER event may have data identifying a function that has been entered during the debuggee program execution. At block 904, a frame corresponding to the entered function may be pushed onto the shadow stack. This may include retrieving data identifying debuggee program variables and their values, and associating them with the frame or instance of the function.

The process may flow to block 906, where a node corresponding to the entered function may be added to the call graph. In one embodiment, this may include setting the entered function node to be a child node of the current function node and setting the cursor to point to the new node. Thus, the new node may become the current function in the call graph. In one implementation, if the current function node (prior to insertion of the new node) has one or more other child nodes, these other child nodes become sibling nodes to the new node.

The process may flow to block 918, where a state transition is performed, such as illustrated in FIG. 2. The process may flow to done block 920, and return to a calling program, such as process 800.

If, at decision block 902, it is determined that that the event is an EXIT event, the process may flow to block 908. An EXIT event may have data identifying a function that is about to be exited during the debuggee program execution. At block 908, a search may be performed to identify the frame on the shadow stack corresponding to the instance of the exiting function. In one implementation, a search may begin at the top of the shadow stack, examining each frame until a frame matching the exiting function is found. It may be assumed that, in a configuration in which recursion exists and a function has multiple active instances, the topmost frame corresponding to the function matches the exiting instance. The actions of block 908 may include popping the matching frame, as well as all frames above it, from the stack.

It is to be noted that a situation in which there are one or more frames above the matching frame may exist in various situations. For example, when the one or more frames have previously been put onto the shadow stack in response to a checkpoint, and the exit of these frames has not been detected because they do not have corresponding EXIT events, they may remain on the stack when an EXIT event for a frame function below them is received. This may occur when the state machine is in a determinate or indeterminate state. This is illustrated in the transition from shadow stack 502F to 502G in FIG. 5, in response to EXIT-7 event 302G.

The process may flow to block 910, where the call graph cursor may be set to point to the parent node of the node corresponding to the exiting function. The actions of block 910 may include searching the call graph to identify the node corresponding to the instance of the exiting function. In a manner similar to that described for searching the shadow stack, an implementation may begin at the current function node, as indicated by the cursor. If the current node does not match the exiting function, the process may examine each parent node until a node matching the exiting function is found. The cursor may then be set to point to the parent node of the matching node, designating this node as the new current function. This is illustrated in the transition from call graph 602F to 602G in FIG. 6B, in response to EXIT-7 event 302G.

The process may flow to block 918, where a state transition is performed, such as illustrated in FIG. 2. The process may flow to done block 920, and return to a calling program, such as process 800.

If, at decision block 902, it is determined that the event is a CHECKPOINT event, the process may flow to block 912, where the shadow stack is updated to match the snapshot of the call stack. In one embodiment, the stacks match when there is a one-to-one correspondence between frames of the call stack and frames of the shadow stack, each corresponding frame representing the equivalent function instance. However, in various implementations, a match may be other than one-to-one matching. For example, the system may be configured to generate a shadow stack matching only a portion of the call stack.

Updating the shadow stack may include adding one or more frames, deleting one or more frames, or both adding and deleting frames. Shadow stacks 502D and 502I are examples of shadow stacks that have been updated in response to a CHECKPOINT event. Shadow stack 502D illustrates an example of inserting frames in the middle and top of the stack; shadow stack 502I illustrates an example of inserting two frames at the top of the stack.

The process may flow to block 914, where the call graph may be updated to match the snapshot of the call stack. As described for updating the shadow stack, updating the call graph may include adding one or more nodes to the call graph. In one implementation, added nodes are set to be active nodes. In one implementation, nodes are not deleted in response to a CHECKPOINT, but are designated as inactive nodes by modifying the cursor. Call graph 602D illustrates an example of adding nodes in response to a CHECKPOINT event. It also illustrates an example of, in response to a CHECKPOINT event, adding a node FUNC4 612 that becomes the current node.

The process may flow to block 918, where a state transition is performed, such as illustrated in FIG. 2. The process may flow to done block 920, and return to a calling program, such as process 800.

Thus, the actions of blocks 906, 910, and 914 are a portion of a mechanism that generates and updates a call graph in response to a combination of call trace events and sample trace events. Blocks 905, 908, and 912 are a portion of a mechanism that generates and updates a shadow stack in response to a combination of call trace events and sample trace events.

In one embodiment, a common frame count (CFC) may be determined. A CFC relative to a first and a second checkpoint indicates the number of frames on a call stack that are in common between the two checkpoints. Frames on the respective stacks are in common if they represent the same instance of a function. For example, if at a first checkpoint the call stack contains frames for functions A, B, and C in that order, an exit of function C follows, and then another call to function C occurs, a second checkpoint may contain frames for A, B, and C2, where C2 represents a different instance of C than existed at the first checkpoint. The CFC value between the first and second checkpoint would be two for this example, since only the frames representing A and B are in common.

A CFC may be used to optimize performance when retrieving events from an event log. For example, if it is desirable to know when function A in the above example was the current function, by examining the CFC between the first and second checkpoints, it is known that there was not a time during this interval when A was the current function, because the CFC never dropped below two.

A determination of a CFC during may be implemented as follows. At a checkpoint, the number of frames in the call stack is stored as K. Each time the height of the shadow stack falls below K, K is set to the height of the shadow stack. This may occur as a result of an EXIT event or another event. Thus K serves as a "low water" mark. At a subsequent checkpoint, K is the CFC between the first checkpoint and the subsequent checkpoint.

In some embodiments, additional mechanisms may be employed to process exceptions in the debuggee program that may occur during execution. In some managed runtime environments, exceptions may be handled in various ways. For example, in one environment, an exception that is thrown may be handled in two phases. In a first phase, the runtime system may traverse the call stack searching for a catch block. In a second phase, the runtime system may traverse the call stack again, removing each frame until a frame corresponding to the catch block is found. Removing frames during the second traversal is referred to as "unwinding" the frames. During the second traversal, "finally" blocks may be executed where they exist in a function and are configured to apply to the exception. A "finally" block may contain calls to one or more functions. When the frame corresponding to the catch block is found during the second traversal, the program code within the catch block is executed.

In some environments, an occurrence of an exception in a debuggee program may cause EXIT events to be missed for one or more functions, though the frames corresponding to these functions are removed from the call stack. Events in addition to those discussed above may be used to track changes in the call stack, so that the changes may be reproduced in the shadow stack. Table 2 lists an example set of events that may be used with the mechanisms described herein to handle debuggee program exceptions.

handling is completed. The events of Table 2 provide an example set of events that may be used to handle exceptions. In various embodiments, other sets of events may be used.

Figure 10:
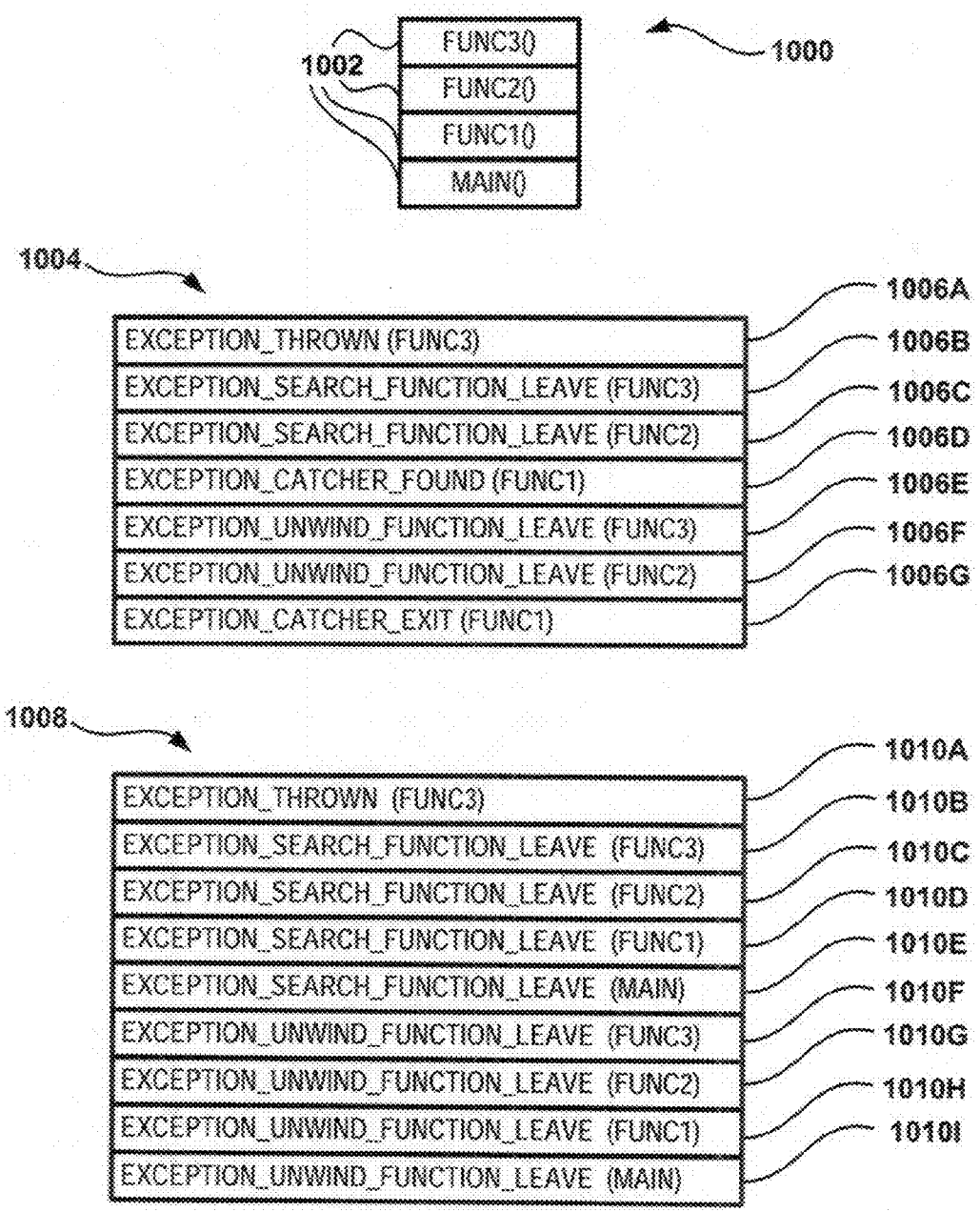
FIG. 10 illustrates an example of processing exception events as part of a mechanism for generating a call graph and shadow stack.

FIG. 10 illustrates an example of processing exception events as part of a mechanism for generating a call graph and shadow stack. Call stack 1000 shows an example call stack of a debuggee program. At the state shown, call stack 1000 includes four frames 1002, corresponding to functions main( ), func1( ), func2( ), and func3( ), with func3( ) at the top of the stack. Event sequence 1004 includes events 1006A-G, illustrating a sequence of events that may occur if the debuggee program throws an exception in func3( ) that has a catch block in func1( ). Event sequence 1004 is now described.

Event 1006A indicates that an exception is thrown from within func3( ). During the search phase of exception handling, event 1006B indicates that func3( ) was searched for a catch block. Event 1006C indicates that func2( ) was searched for a catch block. Event 1006D indicates that a catch block associated with the thrown exception has been found at function func1( ). Next, during the unwinding phase of exception handling, event 1006E-F indicate that the frames corresponding to func3( ) and func2( ), respectively, were unwound. Finally, event 1006G indicates that the catch block in func1( ) was exiting.

During call graph and shadow stack generation, a process may use events 1006A-G to update the shadow stack and call graph. In response to event 1006A, a checkpoint may be performed. Based on events 1006B-F, the system determines to pop func3( ) and func2( ) from the shadow stack. Event 1006G indicates that the debuggee program remained in func1( ) at that point. The call graph may be updated, based on these events, to make func1( ) the current node. The state machine may be set to determinate, since the system may infer that the active nodes are correctly place in the graph.

In a situation in which an exception is thrown in func3( ) and the mechanisms described herein do not received suffi-

TABLE 2

| Exception Events | |
|---|---|
| Event | Meaning |
| EXCEPTION_THROWN | Occurs at the point of the throw. Takes a snapshot of the call stack. |
| EXCEPTION_SEARCH_FUNCTION_LEAVE | Indicates that a frame was searched for a catch block, but none was found. |
| EXCEPTION_CATCHER_FOUND | Indicates that this frame contains a catch block that will handle the exception. |
| EXCEPTION_UNWIND_FUNCTION_LEAVE | Finished unwinding this frame. |
| EXCEPTION_CATCHER_EXIT | Finished executing the catch block; exception handling is complete. |

This set of events provides a mechanism to facilitate logging of events and data, in order to generate a call graph and shadow stack. The EXCEPTION_THROWN event provides a snapshot of the call stack. The system may use this to enter a determinate state. The EXCEPTION_SEARCH_FUNCTION_LEAVE allows the system to track the number of frames that are searched until either a catch block is found or until the search ends without a catch block found. The EXCEPTION_UNWIND_FUNCTION_LEAVE allows the system to remove frames from the shadow stack, and make corresponding call graph nodes inactive, to match the debuggee call stack. The EXCEPTION_CATCHER_EXIT event provides a way for the system to recognize that exception cient information of an associated catch block, event sequence 1008, having events 1010A-I may occur. Event sequence 1008 may be processed in a similar way to that described for event sequence 1004. However, event sequence 1008 does not include an event to indicate a catch block is found. Instead, there is an EXCEPTION_SEARCH_FUNCTION LEAVE event for each function down to and including main( ). The absence of an EXCEPTION_CATCHER_FOUND event prior to the EXCEPTION_UNWIND_FUNCTION_LEAVE events indicates that a catch block is not found. By matching the number of search events with the number of unwind events, the system may know when the stack has completed unwinding. In response to the last unwind event, the system may update the shadow stack and call graph accordingly.

FIG. 11 shows one embodiment of a computing device 1100, illustrating selected components of a computing device that may be used to perform functions described herein and attributed to development system 114. Computing device 1100 may include many more components than those shown, or may include less than all of those illustrated.

As illustrated, computing device 1100 includes one or more processors 1102, which perform actions to execute instructions of various computer programs. In one configuration, each processor 1102 may include one or more central processing units, one or more processor cores, one or more ASICs, cache memory, or other hardware processing components and related program logic. As illustrated, computing device 1100 includes an operating system 1104. Operating system 1104 may be a general purpose or special purpose operating system. The Windows® family of operating systems, by Microsoft Corporation, of Redmond, Wash., are examples of operating systems that may execute on computing device 1100.

Memory 1106 may include one or more of a variety of types of computer storage media, including volatile or non-volatile memory, RAM, ROM, solid-state memory, disk drives, optical storage, or any other medium that can be used to store digital information. In one configuration, memory 1106 may store debuggee program 112, development system 114, and logger 116. In some configurations, any one or more of these components, or a portion thereof, may be implemented in hardware, software, or a combination thereof. Memory 1106 may store log 118, call graph 120, or shadow stack 122.

Computing device 1100 may include a video display adapter 1112 that facilitates display of localized text strings to a user, or a speech component (not shown) that converts text to audio speech and presents the spoken strings to a user. Though not illustrated in FIG. 11, computing device 1100 may include a basic input/output system (BIOS), and associated components. Computing device 1100 may also include a network interface unit 1110 for communicating with a network. Embodiments of computing device 1100 may include one or more of a display monitor 1114, keyboard, pointing device, audio component, microphone, voice recognition component, or other input/output mechanisms.

By combining call trace events and checkpoint snapshots to build a call graph, the mechanisms described herein facilitate improved accuracy of the call graph for many debuggee programs. An accurate call graph may be obtained at execution points for which call trace events by themselves do not provide enough information to build an accurate call graph. At points in which the machine state is indeterminate, the approximations of the call graph or shadow stack may be closer to corresponding structures having complete accuracy.

It is to be noted that the structures and processes described herein apply to a single thread of execution in a debuggee program. In an environment of a multi-threaded debuggee program, the mechanisms may be applied to each thread, such that each thread has a corresponding call graph and shadow stack. Logging and retrieval of events may be performed so that events of different threads may be distinguished and processed with respect to their corresponding structures.

It will be understood that each block of the flowchart illustration of FIGS. 7-9, and combinations of blocks in the flowchart illustration, can be implemented by software instructions. These program instructions may be provided to a processor to produce a machine, such that the instructions, which execute on the processor, create means for implementing the actions specified in the flowchart block or blocks. The software instructions may be executed by a processor to provide steps for implementing the actions specified in the flowchart block or blocks. In addition, one or more blocks or combinations of blocks in the flowchart illustrations may also be performed concurrently with other blocks or combinations of blocks, or even in a different sequence than illustrated without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A computer-based method of generating a call graph representing function calls in a debuggee computer program, comprising:
   a) receiving a stream of logged events, including a plurality of call trace events and at least one sample trace event;
   b) generating the call graph based on the plurality of call trace events and the at least one sample trace event, generating the call graph comprising:
      i) adding a first node to the call graph based on a call trace event, of the plurality of call trace events, indicating that a first function corresponding to the first node has been invoked; and
      ii) adding a second node to the call graph based on a sample trace event indicating that a second function corresponding to the second node has been invoked.

2. The computer-based method of claim 1, the call graph comprising a tree structure and a cursor, the cursor indicating one or more active nodes of the tree structure, including a current active node.

3. The computer-based method of claim 1, further comprising modifying the call graph to indicate that the second node is not an active node, based on another call trace event indicating that the first function has exited.

4. The computer-based method of claim 1, the first function is an instrumented function having at least one probe, the second function is a non-instrumented function without a corresponding call trace event in the stream of logged events.

5. The computer-based method of claim 1, further comprising:
   a) generating a shadow stack corresponding to an execution of the debuggee program, based on the at least one sample trace event; and
   b) adding a frame corresponding to the first function to the shadow stack, based on the call trace event.

6. The computer-based method of claim 5, further comprising determining a common frame count (CFC) based on a first checkpoint, a second checkpoint, and another call trace event indicating that the first function has exited.

7. The computer-based method of claim 1, further comprising:
   a) receiving at least one exception event indicating that an exception has occurred in the debuggee program;
   b) modifying the call graph to indicate that a plurality of functions have exited, based on the at least one exception event.

8. The computer-based method of claim 7, further comprising adding a third node to the call graph to indicate a third function invoked during handling of the exception in the debuggee program.

9. The computer-based method of claim 7, the debuggee program having an associated call stack, modifying the call graph comprising:
   a) generating a shadow stack corresponding to an execution of the debuggee program, based on the at least one sample trace event;
   b) determining a number of frames in the call stack searched during handling of the exception in the debuggee program; and
   c) deleting approximately the number of frames searched from the shadow stack.

10. A computer-based development system for generating a call graph representing function calls in a debuggee computer program, the debuggee computer program having a corresponding call stack, the system configured to perform actions including:
   a) receiving a stream of events including a plurality of call trace events and a plurality of sample trace events;
   b) generating a call graph based on the stream of events, the call graph having at least one active node, generating the call graph comprising:
      i) in response to receiving a call trace event indicative of a function invocation, adding a node corresponding to the function in the call graph; and
      iv) in response to receiving a sample trace event representative of a snapshot of the call stack, updating the call graph by adding a first set of nodes based on the snapshot or indicating that a second set of nodes on the call graph are inactive;
   c) generating a shadow stack based on the sample trace event; and
   d) maintaining the shadow stack and the call graph so that the call graph matches the shadow stack with respect to call graph active nodes.

11. The computer-based system of claim 10, the actions further comprising in response to receiving a call trace event indicative of the function exit, indicating that at least one node of the first set of nodes is inactive.

12. The computer-based system of claim 10, the actions further comprising:
   a) in response to receiving a sample trace event, adding a frame to the shadow stack; and
   b) in response to receiving a call trace event, deleting the frame from the shadow stack.

13. The computer-based system of claim 10, further comprising means for modifying the call graph to indicate a debuggee computer program function invoked during handling of an exception, based on at least one sample trace event that occurred during handling of the exception.

14. The computer-based system of claim 10, further comprising means for modifying the call graph based on receiving at least one event indicating an occurrence of an exception in the debuggee computer program.

15. A computer-readable storage medium comprising computer program instructions for generating a call graph based on a plurality of logged call trace events and at least one sample trace event that result from execution of a debuggee program having a call stack, the program instructions executable by a processor to perform actions including:
   a) receiving a stream of the plurality of logged call trace events and at the least one sample trace event;
   b) in response to receiving a call trace event of the plurality of logged call trace events, updating a call graph;
   c) in response to receiving a sample trace event, of the at least one sample trace event, representing a snapshot of the call stack, updating the call graph; and
   d) selectively performing a snapshot of the call stack based on a number of call trace events that have occurred, a size of the call stack, or an amount of a system resource allocated.

16. The computer-readable storage medium of claim 15, the call trace event indicative of a first function invocation the actions further comprising:
   a) in response to receiving the call trace event, adding a first node corresponding to the first function to the call graph;
   b) in response to receiving the sample trace event, adding a second node corresponding to a second function to the call graph; and
   c) in response to receiving another call trace event indicative of the first function exiting, modifying the call graph to indicate that the first node and the second node are not active nodes.

17. The computer-readable storage medium of claim 15, the actions further comprising:
   a) receiving at least one exception event indicating that at least one frame has been unwound from a call stack in response to an exception in the debuggee program;
   b) determining a current node in the call graph based on the at least one exception event; and
   c) in response to receiving the at least one exception event, modifying the call graph to indicate the current node.

18. The computer-readable storage medium of claim 15, the actions further comprising determining a common frame count (CFC) based on a first checkpoint, a second checkpoint, and the call trace event.

19. The computer-readable storage medium of claim 15, the actions further comprising:
   a) receiving at least one exception event indicating that at least one frame was searched for a catch block in response to an exception in the debuggee program; and
   b) modifying the call graph based on the at least one exception event.

20. The computer-readable storage medium of claim 15, the actions further comprising maintaining a state, the state indicative of a determinate state or an indeterminate state, and processing events based on the state.

* * * * *